United States Patent [19]
Suzuki

[11] Patent Number: 5,995,515
[45] Date of Patent: Nov. 30, 1999

[54] COMMUNICATION SYSTEM, BASE STATION, MOBILE STATION, AND RADIO COMMUNICATION SYSTEM

[75] Inventor: Mitsuhiro Suzuki, Tokyo, Japan

[73] Assignee: Sony Corporation, Tokyo, Japan

[21] Appl. No.: 08/602,760

[22] PCT Filed: Jun. 20, 1995

[86] PCT No.: PCT/JP95/01221

§ 371 Date: Jun. 13, 1996

§ 102(e) Date: Jun. 13, 1996

[87] PCT Pub. No.: WO95/35641

PCT Pub. Date: Dec. 28, 1995

[30] Foreign Application Priority Data

Jun. 20, 1994 [JP] Japan ................................. 6-137457

[51] Int. Cl.⁶ ....................................................... H04J 3/06
[52] U.S. Cl. ........................... 370/465; 370/350; 370/347
[58] Field of Search ........................ 455/68, 69; 375/227, 375/285, 365; 371/5.5, 47.1; 370/310, 350, 465, 468, 510, 914, 503, 513, 514, 515, 535, 442, 480, 321, 319, 337, 336, 338, 347, 344, 349, 474, 476, 332, 333

[56] References Cited

U.S. PATENT DOCUMENTS

| | | | |
|---|---|---|---|
| 3,534,264 | 10/1970 | Blasbalg et al. | 375/285 |
| 4,697,281 | 9/1987 | O'Sullivan | 455/69 |
| 4,912,705 | 3/1990 | Paneth et al. | 370/447 |
| 4,991,184 | 2/1991 | Hashimoto | 455/69 |
| 5,327,576 | 7/1994 | Uddenfeldt et al. | 455/436 |
| 5,590,405 | 12/1996 | Daly et al. | 370/468 |

*Primary Examiner*—Dang Ton
*Attorney, Agent, or Firm*—Jay H. Maioli

[57] ABSTRACT

In a radio telephone system using a digital circuit, a transmission-line state of a radio telephone digital circuit is detected by a detector. In response to the transmission-line state detected by the a detector, a multiplexing rate for transmission or reception in the radio telephone digital circuit is changed.

28 Claims, 32 Drawing Sheets

Constellation of Information Series

Constellation of Sync. Word Multiplied by ($\alpha = 0.5$)

Constellation of Transmission Series

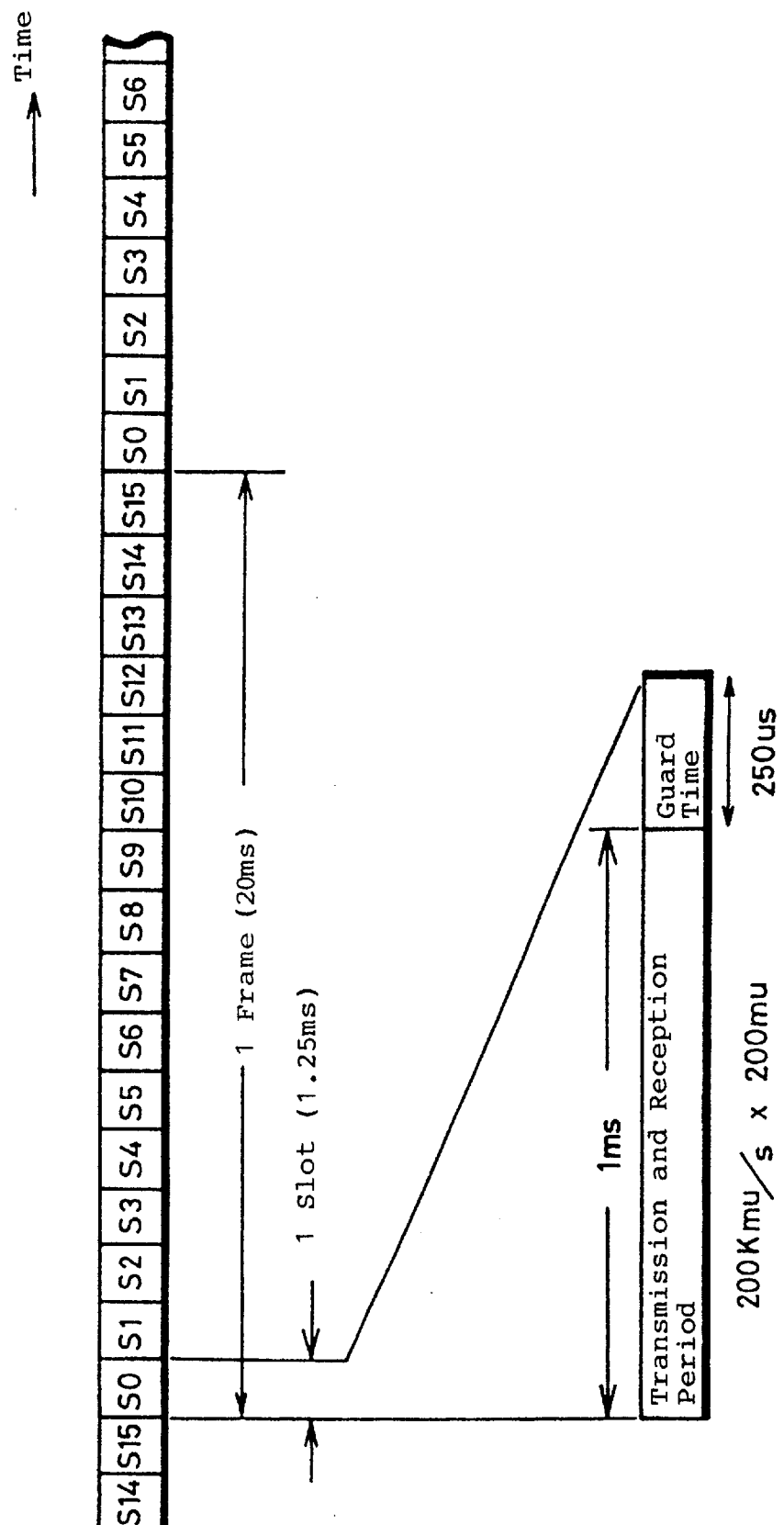

F I G. 11A Correlation Value of Sync. Word of Base Station A
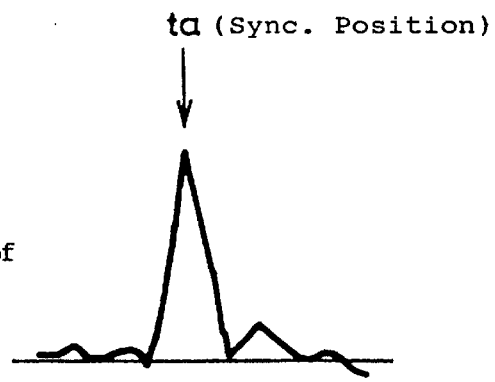
F I G. 11B Correlation Value of Sync. Word of Base Station B
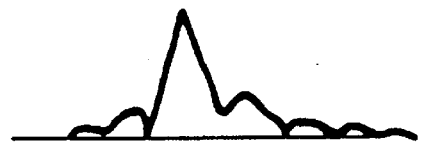
F I G. 11C Correlation Value of Sync. Word of Base Station C

F I G. 30
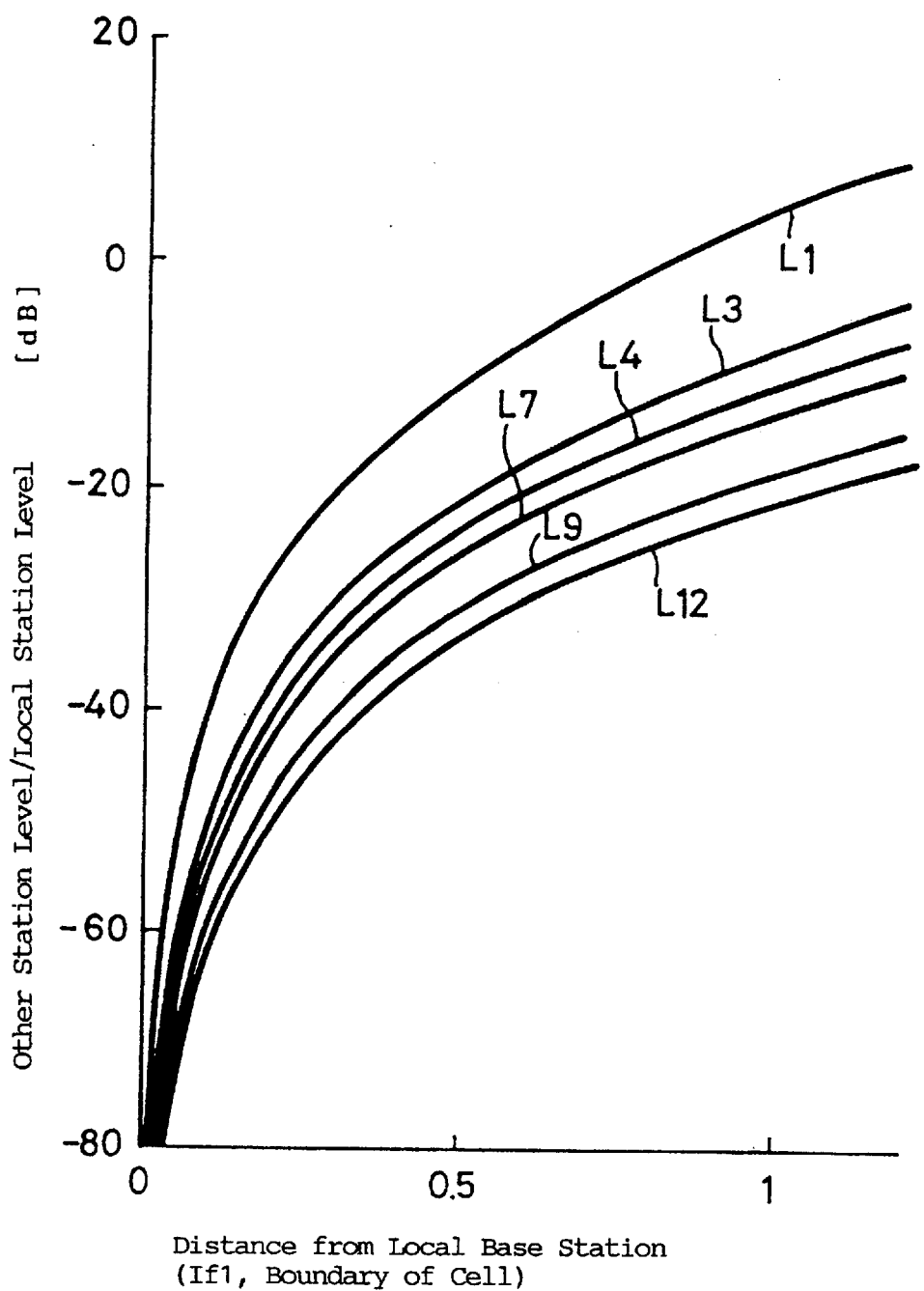

5,995,515

COMMUNICATION SYSTEM, BASE STATION, MOBILE STATION, AND RADIO COMMUNICATION SYSTEM

TECHNICAL FIELD

The present invention relates to a communication system, a base station, a mobile station and a radio communication system. In particular, the present invention relates to a communication system and a radio communication system for communication of digital data between a base station and a mobile station (a terminal station), and to a base station and a mobile station used for these systems.

BACKGROUND ART

Various systems for communication via a base station have been developed as a communication system for a radio communication. Specifically, in the case of a communication system which has already been put into practice as a radio telephone, for example, a telephone circuit for a radio communication is set between a base station connected through a wire telephone circuit to a telephone exchange side and a radio telephone apparatus (a mobile station) which is a terminal side telephone, thereby a call service being carried out between a called telephone connected through the telephone exchange and the radio telephone apparatus.

Such radio telephone apparatus as a terminal side apparatus includes a miniaturized portable radio telephone and a land mobile radio telephone mounted on an automobile, etc.

In a communication system employing such radio telephone apparatus, communication between the base station and the terminal side telephone apparatus has been carried out by a radio transmission of an analog signal. On the other hand, in order to efficiently use a transmission band, a communication system for carrying out communication between the base station and the terminal side by a radio transmission of a digital data is developed.

In this digital communication system, transmission and reception of the digital data between the base station and the mobile station are carried out in accordance with an efficient transmission system such as a TDM system (time division multiplex system), a TDMA system (time division multiple access system) and so on, and an audio signal is subjected to a high-efficiency coding and decoding. Therefore, as compared with an analog communication system, it is possible to use a transmission line very efficiently for thereby setting more transmission channels and so on and to realize transmission of a call sound having less noise.

Another communication system to which the digital communication system is applied includes a CDMA system (code division multiple access system), an FDMA system (frequency division multiple access system) and so on. In these systems, the transmission or the like is more efficient as compared with communication carried out by analog transmission.

An example of a TDMA system communication system which is proposed at present will be described. Frequency bands of 800 MHz and 1.5 GHz are used for communication, and in each of the frequency bands, a channel interval is set to 25 kHz. Transmission in a down circuit from the base station to the mobile station is carried out by the TDM system, and transmission in an up circuit from the mobile station to the base station is carried out by the TDMA system. A phase modulation such as a π/4 shift DQPSK modulation, for example, is employed as a transmission data modulation system.

In the transmission of the TDM system and the TDMA system, as shown in FIG. 1, for example, assuming that one frame is formed of six time slots of time slots 0 to 5 and a sub frame is formed of a half of one frame, transmission in the down circuit from the base station to the mobile station, for example, is carried out at timings of the time slots 1 and 4 of the sub frame period, and transmission in the up circuit from the mobile station to the base station is carried out during predetermined periods immediately before the time slots for transmission in the down circuit. In this case, the same frequency is used for transmission in each time slot.

A signal transmitted from the base station has a synchronizing word whose bit number is about 20 bits and which is located at a substantial center thereof. The synchronizing word is previously determined depending on systems, and hence the same synchronizing word is used in each of the base stations of the same radio telephone system.

The mobile station side receives the synchronizing word transmitted from the base station and carries out a synchronizing processing for communication with the base station with reference to a timing at which it receives the synchronizing word.

Each of the base stations transmits a broadcasting information on a predetermined frequency channel and time slot. When each of the mobile stations carries out an initial reception (i.e., when it initially searches for a base station with which it can communicate), it carries out the reception processing with respect to all the channels and time slots on which the broadcasting information may be transmitted. It measures a received electric field intensity (RSSI) and so on with respect to the respective channels and time slots to determine that a signal on a channel on which the broadcasting information can precisely be received with a high received electric field intensity is a signal from the closest base station. Then, each of the mobile stations synchronizes its reception frequency with that of the signal on the determined channel.

After commencing communication with a certain base station as described above, each of the mobile stations receives a signal on a channel of a cell adjacent to the base station during an idle slot (i.e., a period during which it does not communicate with the base station) based on information of a frequency channel of the adjacent cell which is transmitted from the base station in the broadcasting information, measuring its received electric field intensity. When the received electric field intensity of the adjacent cell becomes more higher as compared with the received electric field intensity of the cell in which it is communicating with the base unit, the mobile station carries out a hand-off processing for switching communication to communication with a base station of the adjacent cell.

Each of the base stations has a defined synchronizing burst. When the hand-off processing is carried out, the synchronizing burst is transmitted and received between the base station and the mobile station, thereby the mobile station obtaining synchronization with the base station.

In the case of the digital radio telephone system in which the transmission is carried out in accordance with such TDMA system, while multiple access on one channel is made possible by independently using time slots prepared in one frame and the transmission channel can be used efficiently, a ratio in time used for communication with each mobile station is fixed regardless of a communication state. Specifically, in the case of the example shown in FIG. 1, for example, since two time slots of six time slots prepared in one frame are used for communication, the time ratio is fixed to 1/3. When the time ratio is thus fixed, it is easy to control communication, while it is sometimes possible to carry out communication with less time ratio depending upon a state of communication between the base station and the mobile station, and when the communication state is not satisfactory, communication with longer time ratio is sometimes requested. However, the conventional communication system of this kind has a fixed time ratio regardless of the communication state, and hence the circuit is not always used efficiently.

Since transmission of the TDMA system has been described above, the time ratio is fixed. In the case of the CDMA system, the communication is carried out with a fixed use ratio of codes. In the case of the FDMA system, the communication is carried out with a fixed use ratio of a frequency.

One frequency is allocated to one circuit. When the mobile station is in such a slow fading state that it is comparatively slowly moving due to a user's walking or the like, once the mobile station is brought in a bottom of a fading state where a reception state is unsatisfactory, it takes long time for the mobile station to be brought out of the bottom of the fading state. Therefore, an unsatisfactory communication state is continued comparatively long and hence a speech quality is deteriorated temporarily.

The synchronizing word allocated to each time slot is highly likely to be erroneously detected because of mutual interference with another data in the same time slot. Therefore, it is necessary to take some countermeasure for preventing an erroneous synchronization.

Since the synchronizing word is formed of a comparatively small number of bits, about 20 bits, it is difficult to estimate a state of a transmission line based on a reception state of the synchronizing word.

When each of the mobile stations carries out the initial reception, it is necessary for it to carry out a processing for searching a channel on which a signal can satisfactorily be detected, by receiving signals on all the channels and time slots on which the broadcasting information may be transmitted. Therefore, there is then the disadvantage that it takes long time for the mobile station to detect the channel on which communication can be carried out.

When the mobile station carries out the hand-off processing for switching the communication to the communication with the adjacent cell, it is necessary for it to receive information of the channel frequency of the adjacent base station from the base station. Therefore, each of the base stations is required to store information of allocated frequencies of all the stations adjacent thereto and so on. Moreover, each of the mobile stations needs to receive control signals from the adjacent base stations to measure their electric field intensities during a period of the idle time slot on which the communication with the base station is not carried out. Therefore, since it is required to carry out reception which does not relates directly to communication for telephone call, a reception time required at the mobile station is increased to that extent. A power required for the communication is increased to that extent and an arrangement for control thereof is required, which complicates an arrangement of an apparatus of the mobile station.

When the mobile station carries out the hand-off processing, it is necessary to receive the synchronizing burst of a station to which the base station is switched for obtaining the synchronization. Upon the hand-off processing, sometimes there may temporarily be a time during which the mobile station cannot communicate with the station to which the base station is switched until the synchronization with the station is obtained. Once this accident happens, the call sound is temporarily interrupted upon the hand-off processing.

DISCLOSURE OF THE INVENTION

In view of the above problems, the present invention is made and an object thereof is to provide a communication system and a radio communication system which allows constantly efficient and satisfactory communication, and a base station and a mobile station used in these systems.

According to a communication system of a first invention, the communication system includes at least one base station and at least one mobile station for transmitting and receiving data between the above base station and it. At least any one of the above base station and the above mobile station detects a transmission quality and changes a multiplexing rate of a transmission data based on a detected transmission quality. Therefore, by changing the multiplexing rate of the data based on the transmission quality to set an optimum multiplexing rate in response to the transmission quality, it is possible to efficiently transmit the data with a minimum multiplexing rate.

According to a communication system of a second invention, in the communication system of the first invention, the above base station changes the multiplexing rate of the transmission data based on the detected transmission quality. Therefore, under the control of the base station side, it is possible to set the multiplexing rate properly and to control communication satisfactorily.

According to a communication system of a third invention, in the communication system of the first invention, at least any one of the above base station and the above mobile station includes a detecting means for detecting the transmission quality based on a received data. Therefore, it is possible to satisfactorily carry out a processing for setting the multiplexing rate.

According to a communication system of a fourth invention, in the communication system of the third invention, the above base station changes the multiplexing rate of the transmission data by changing a coding rate of the transmission data based on the transmission quality detected by the above detecting means.

According to a communication system of a fifth invention, in the communication system of the third invention, the above base station mixes the transmission data with a synchronizing word at a constant ratio to transmit it, and the above detecting means of the above mobile station detects correlation of the transmitted synchronizing word to thereby detect a state of the above circuit. Therefore, when receiving the transmitted data, the mobile station can detect the synchronizing word. It becomes unnecessary to receive and process only the synchronizing word, which increases transmission efficiency. It is possible to satisfactorily detect the circuit state and hence it is possible to control the multiplexing rate and so on satisfactorily.

According to a communication system of a sixth invention, in the communication system of the first invention, the above communication system is arranged such that synchronizing words which differ from one another are set for respective base stations and the respective base stations transmit signals in synchronization with one another at a maximum multiplexing rate in a state of frequency and slot equally allocated to every base station, and the mobile station carries out a reception operation with a predetermined frequency and slot and calculates a correlation value between a reference synchronizing word and a received signal to select a base station corresponding to a received signal indicating a highest correlation value. Therefore, only by receiving the data with predetermined frequency and time slot to detect the correlation value, it is possible for the mobile station side to select the base station satisfactorily. It is possible to select an optimum base station with a simple processing.

According to a communication system of a seventh invention, in the communication system of the first invention, the above mobile station detects correlation between a signal transmitted from a base station transmitting and receiving data thereto and therefrom and a synchronizing word corresponding to the above base station transmitting and receiving data thereto and therefrom, detects correlation between a signal transmitted from at least one base station adjacent to the above base station transmitting and receiving data thereto and therefrom and a synchronizing word corresponding to the adjacent base station, and, when the correlation value between the signal transmitted from the above adjacent base station and the synchronizing word corresponding to the above adjacent base station is higher than the correlation value between the synchronizing word corresponding the above base station transmitting and receiving data thereto and therefrom and the signal transmitted from the above base station transmitting and receiving data thereto and therefrom, carries out a processing for hand-off to the above adjacent base station. Therefore, it is simply and accurately determined whether or not a hand-off processing should be carried out. It is possible to maintain communication by carrying out the hand-off processing satisfactorily.

According to a communication system of an eighth invention, in the communication system of the first invention, the above base station further includes an encoding means for subjecting the transmission data to a scrambling processing, and the above mobile station includes a decoding means for subjecting a received signal to a de-scrambling processing. Therefore, it is possible to scramble the data and to satisfactorily transmit it.

According to a base station of a ninth invention, the base station is a base station for transmitting and receiving data between it and at least one mobile station, and includes a transmission means for multiplexing and transmitting data, a reception means for receiving a data transmitted from the above mobile station, and a control means for changing a multiplexing rate of the above transmission means based on a data of a detected transmission quality from the above mobile station. Therefore, the multiplexing rate of the data is changed under the control of the base station side, and it is possible to efficiently control communication with the mobile station at an optimum multiplexing rate.

According to a base station of a tenth invention, in the base station of the ninth invention, the above base station further includes a detecting means for, based on a data transmitted from the above mobile station, detecting the transmission quality between the latter and the above base station, and the above control means changes the multiplexing rate of the above transmission means based on a data of a detected transmission quality from the above mobile station and the transmission quality detected by the above detecting means. Therefore, the multiplexing rate is changed based on both of the transmission quality detected by the base station and the transmission quality detected by the mobile station, and it is possible for both of the base station and the mobile station to secure satisfactory reception states.

According to a base station of an eleventh invention, in the base station of the ninth invention, the above transmission means includes a synchronizing-word generating means and an adding means for adding a synchronizing word from the above synchronizing-word generating means to a signal-processed data in a predetermined ratio. Therefore, it is possible for the base station to transmit the synchronizing word efficiently.

According to a base station of a twelfth invention, in the base station of the ninth invention, the above transmission means includes a synchronizing-word generating means and an adding means for adding a synchronizing word from the above synchronizing-word generating means to a data signal-processed by multiplication with a predetermined coefficient in a predetermined ratio. Therefore, it is possible to set a transmission state of the synchronizing word satisfactorily.

According to a mobile station of a thirteen invention, a mobile station for transmitting and receiving multiplexed data between it and a base station, includes a demodulating means for receiving a data transmitted from the above base station and demodulating the same, a detecting means for detecting quality of transmission between it and the above base station, and a transmission means for transmitting data to the above base station and transmitting thereto data concerning the transmission quality detected by the above detecting means. Therefore, it is possible to satisfactorily transmit the data concerning the transmission quality to the base station.

According to a mobile station of a fourteen invention, in the mobile station of the thirteenth invention, the above mobile station generates for the above base station a signal used for changing the multiplexing rate based on a detected result of the above detecting means and the generated signal used for changing the multiplexing rate is transmitted by the above transmission means to the above base station. Therefore, it is possible to change the multiplexing rate in accordance with a command from the mobile station side.

According to a mobile station of a fifteenth invention, in the mobile station of the thirteenth invention, the above detecting means includes a first detecting means for detecting correlation between a synchronizing word transmitted from a base station and a reference synchronizing word, and a second detecting means for detecting a S/N ratio of an output from the above first detecting means. Therefore, it is possible for the mobile station to detect the transmission quality satisfactorily.

According to a mobile station of a sixteenth invention, in the mobile station of the thirteenth invention, the above demodulating means includes a reception means, a generating means for generating a pseudo synchronizing word based on the reference synchronizing word and an estimation information about a state of a circuit set between it and said base station, and an extracting means for extracting a data from an output from the above reception means by using the pseudo synchronizing word from the above generating means. Therefore, it is possible to satisfactorily carry out a processing for demodulating the data in synchronization with the signal transmitted from the base station.

According to a mobile station of a seventeenth invention, in the mobile station of the sixteenth invention, the above generating means includes a first generating means for generating the above reference synchronizing word, an estimating means for estimating a state of a circuit set between it and the above base station based on an output from the above reception means,and a second generating means for generating a pseudo synchronizing word based on the reference synchronizing word from the above first generating means and an output from the above estimating means. Therefore, it is possible to satisfactorily generate the pseudo synchronizing word, and consequently it is possible to satisfactorily detect the synchronizing word included in the received signal.

According to a mobile station of an eighteenth invention, in the mobile station of the sixteenth invention, the above mobile station further includes a generating means for generating a plurality of synchronizing words, and a synchronizing-word selecting means for detecting correlations between a received signal from the above demodulating means and the respective plurality of synchronizing words form the above generating means and for selecting a synchronizing word from the above generating means having a highest correlation value. The above demodulating means is controlled based on the synchronizing word output from the above selecting means. Therefore, it is possible to easily select the signal which can be received satisfactorily.

According to a mobile station of a nineteenth invention, in the mobile station of the eighteenth invention, the above synchronizing-word selecting means includes a correlation value detecting means for detecting correlations between a received signal from the above demodulating means and respective plurality of synchronizing words from the above generating means, and a selecting means for selecting a synchronizing word from the above generating means having a highest correlation value based on an output from the above correlation value detecting means. Therefore, it is possible to satisfactorily select the synchronizing word.

According to a mobile station of a twentieth invention, in the mobile station of the nineteenth invention, the above synchronizing-word selecting means includes a position detecting means for detecting a position with a highest correlation value based on an output from the above selecting means. Therefore, it is possible to satisfactorily determine the timing synchronized with the received signal.

According to a mobile station of a twenty-first invention, in the mobile station of the nineteenth invention, the above synchronizing-word selecting means further includes a base-station selecting means for selecting a base station based on an output from the above correlation value detecting means. Therefore, it is possible to satisfactorily select the base station.

According to a radio communication system of a twenty-second invention, the radio communication system includes at least one base station for multiplexing data and transmitting the same, and at least one mobile station for transmission and receiving data between it and the above base station through a radio transmission line, being arranged such that at least any one of the above base station and the above mobile station detects the transmission quality of the data transmitted through the radio transmission line based on a data transmitted through the radio transmission line and changes the multiplexing rate of the transmission data based on the detected transmission quality. Therefore, it is possible to satisfactorily transmit the data between the base station and the mobile station by changing the multiplexing rate of the data depending upon the transmission state.

According to a radio communication system of a twenty-third invention, in the radio communication system of the twenty-second invention, the above communication system is arranged such that when the detected transmission quality is aggravated, the multiplexing rate is lowered, and when the detected transmission quality is satisfactory, the multiplexing rate is increased. Therefore, it is possible to satisfactorily set the multiplexing rate.

According to a radio communication system of a twenty-fourth invention, in the radio communication system of the twenty-third invention, the above base station changes the multiplexing rate of the transmission data based on the detected transmission quality. Therefore, it is possible to satisfactorily set the transmission state by controlling the multiplexing rate of the data on the base station side.

According to a radio communication system of a twenty-fifth invention, in the radio communication system of the twenty-second invention, at least any one of the above base station and the above mobile station includes a detecting means for detecting the transmission quality based on the received data. Therefore, it is possible to satisfactorily detect the transmission quality to thereby change the multiplexing rate of the transmission data.

According to a radio communication system of a twenty-sixth invention, in the radio communication system of the twenty-fifth invention, the above base station changes the multiplexing rate of the transmission data by changing the coding rate of the transmission data, based on the transmission quality detected by the above detecting means. Therefore, it is possible to satisfactorily carry out the processing for changing the multiplexing rate by changing the coding rate.

According to a radio communication system of a twenty-seventh invention, in the radio communication system of the twenty-fifth invention, the above base station mixes the transmission data with the synchronizing word in a constant ratio to transmit it, and the above detecting means of the above mobile station detects correlation of the transmitted synchronizing word to thereby detect a state of the above circuit. Therefore, it is possible to efficiently and satisfactorily transmit the synchronizing word.

According to a radio communication system of a twenty-eighth invention, in the radio communication system of the twenty-second invention, the above communication system is arranged such that synchronizing words which differ from one another are set for respective base stations and the respective base stations transmit signals in synchronization with one another at a maximum multiplexing rate in a state of frequency and slot equally allocated to every base station, and the mobile station carries out a reception operation with predetermined frequency and time slot and calculates a correlation value between the reference synchronizing word and a received signal to select a base station corresponding to a received signal indicating a highest correlation value. Therefore, it is possible for the mobile station to satisfactorily select the base station from which a signal can be received.

According to a radio communication system of a twenty-ninth invention, in the radio communication system of the twenty-second invention, the above mobile station detects correlation between a signal transmitted from a base station transmitting and receiving data thereto and therefrom and a synchronizing word corresponding to the above base station transmitting and receiving data thereto and therefrom, detects correlation between a signal transmitted from at least one base station adjacent to the above base station transmitting and receiving data thereto and therefrom and the synchronizing word corresponding to the adjacent base station, and, when the correlation value between a signal transmitted from the above adjacent base station and the synchronizing word corresponding to the above adjacent base station is higher than the correlation value between the synchronizing word corresponding the above base station transmitting and receiving data thereto and therefrom and the signal transmitted from the above base station transmitting and receiving data thereto and therefrom, carries out a processing for hand-off to the above adjacent base station. Therefore, it is possible to efficiently carry out the hand-off processing based on the processing of detecting the synchronizing word.

According to a radio communication system of a thirtieth invention, in the radio communication system of the twenty-second invention, the above mobile station includes a decoder for demodulating a received data by using a Viterbi algorithm. The above decoder determines, when the number of data 0 stored in path memories of the number of states of the above decoder is close to the number of states, that a bit data received at that time has reliability, and determines, when the number of data 0 is equal to the number of data 1, that the received bit data has low reliability. Therefore, it is possible to determine the reliability of the received data simultaneously with demodulation of the received data.

According to a radio communication system of a thirty-first invention, in the radio communication system of the twenty-second invention, the above base station further includes an encoding means for subjecting the transmission data to a scrambling processing, and the above mobile station includes a decoding means for subjecting the received signal to a de-scrambling processing. Therefore, it is possible to satisfactorily transmit the scrambled data.

BRIEF DESCRIPTION OF DRAWINGS

FIG. 5 is an explanatory diagram showing a frame arrangement according to the embodiment;

FIGS. 11(A–C) is a waveform diagram showing an example of detection of correlation according to the embodiment;

FIG. 30 is a characteristic graph showing an up circuit from the mobile station according to the embodiment;

BEST MODE CARRYING OUT THE INVENTION

An embodiment according to the present invention will hereinafter be described with reference to FIGS. 2 through 31.

In this embodiment, the present invention is applied to a digital radio telephone system in which radio communication of a high-efficiency coded digital data is carried out between a base station and a portable radio telephone apparatus (mobile station) as a terminal apparatus, the system being a system called a so-called cellular system in which a plurality of base stations are located in a predetermined state.

Arrangement of Base Station

Figure 2:
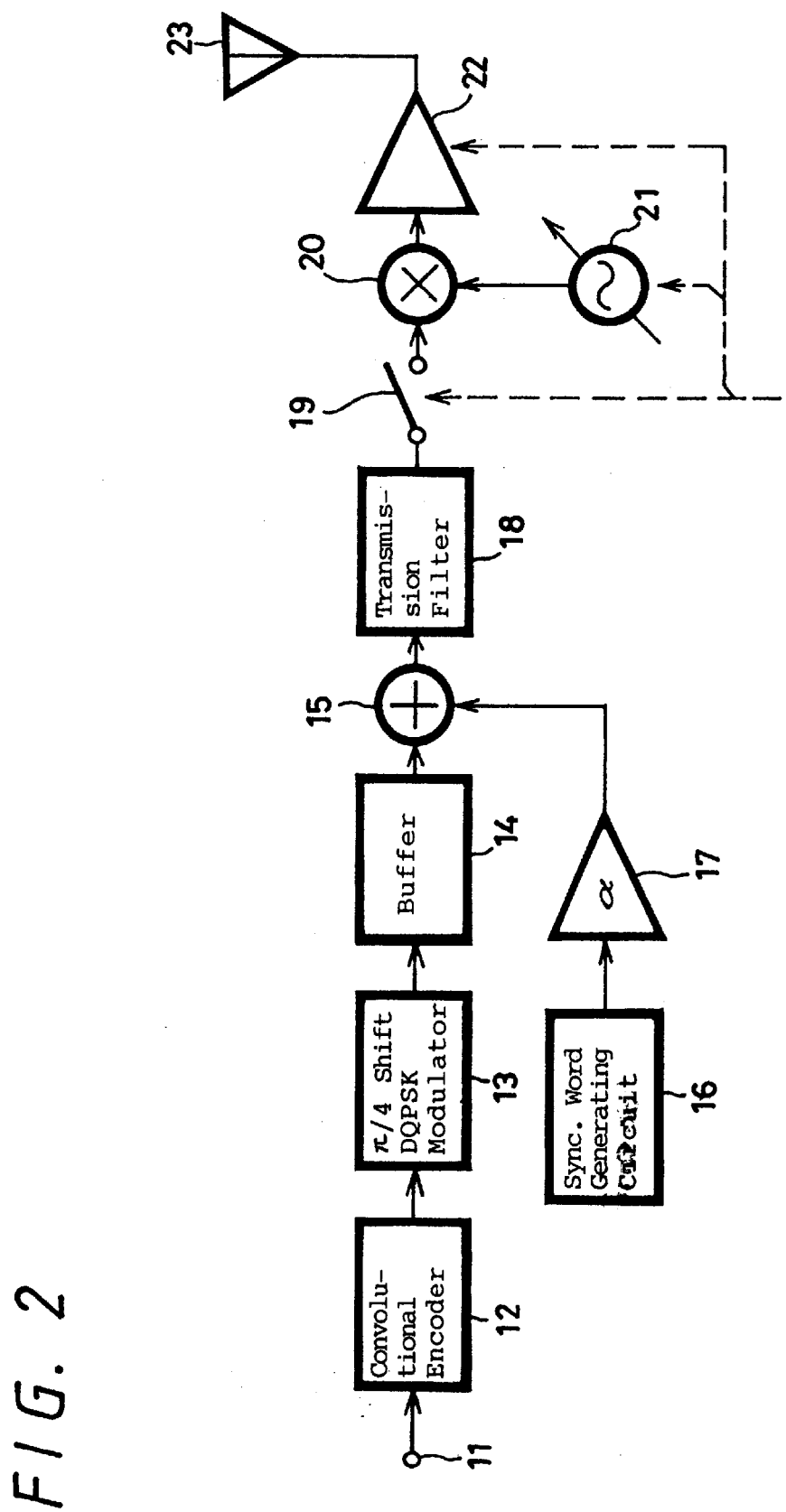
FIG. 2 is a diagram showing an arrangement of a transmission system of a base station according to an embodiment of the present invention.

FIG. 2 shows an arrangement of a transmission system of the base station side. In FIG. 2, reference numeral 11 depicts an input terminal for data (data such as audio data for telephone call or the like) transmitted from the base station. A transmission data obtained at the input terminal 11 is supplied to a convolutional encoder 12 which subjects the same to a convolutional encoding. A transmission data subjected to the convolutional encoding is subjected by a π/4 shift DQPSK modulator 13 to π/4 shift DQPSK modulation which is phase modulation. A transmission data subjected to the π/4 shift DQPSK modulation is supplied to a buffer 14 which carries out a processing for multiplexing data required upon transmission. This processing is carried out by a time slot unit with a processing state being changed depending upon a transmission state. A specific processing thereof will be described later on.

A transmission data output from the buffer 14 is supplied to an adder 15 which carries out a processing for adding a synchronizing word thereto. Specifically, an inherent synchronizing word of a predetermined bit number is set for each of the base stations. The mobile station carries out communication with the base station in synchronization with a timing indicated by the synchronizing word. A synchronizing-word generating circuit 16 outputs the inherent synchronizing word as a π/4 shift DQPSK modulated data. The data of the synchronizing word output from the synchronizing-word generating circuit 16 is supplied to a coefficient multiplier 17 which multiplies the same by α. The synchronizing word data multiplied by α is supplied therefrom to the adder 15 which mixes it with the transmission data output from the buffer 14.

Figure 3:
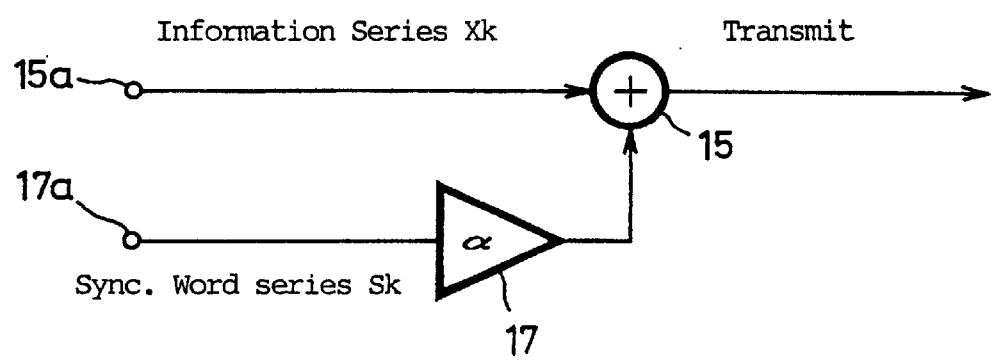
FIG. 3 is a diagram showing an arrangement for a synchronizing-word adding processing in the embodiment shown in FIG. 2.

In this embodiment, a coefficient a multiplied by the coefficient multiplier 17 is set to 0.5 (or a value around it). As shown in FIG. 3, the adder 15 adds a signal obtained by multiplying a synchronizing word series Sk obtained at a terminal 17a by 0.5 to an information series Xk which is a multiplexed transmission data output from the buffer 14 and obtained at a terminal 15a, thus obtaining a transmission series tk.

Figure 4A:
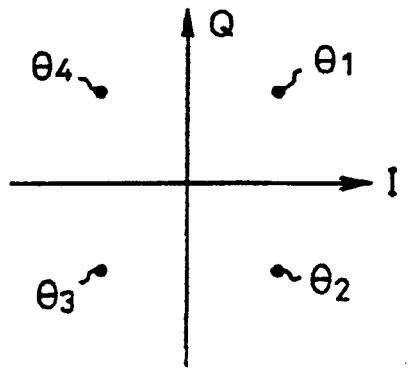
FIGS. 4(A–C) is an explanatory diagram showing a synchronizing-word added state according to the embodiment.
Figure 4B:
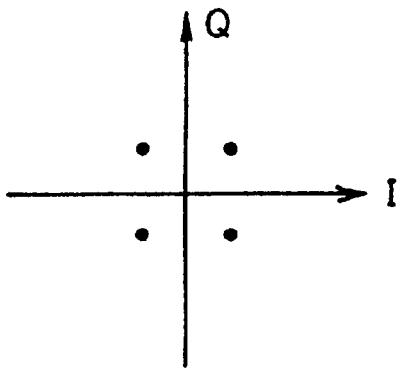
Figure 4C:
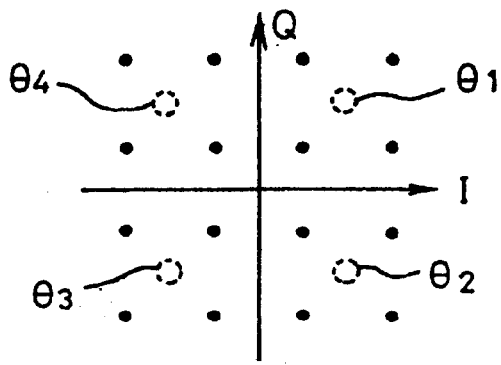

FIGS. 4(A–C) shows constellation of the data thus processed. Specifically, as shown in FIG. 4A, the information series Xk which is the transmission data subjected to the π/4 shift DQPSK modulation is a data indicating any one of four values $\theta_1$, $\theta_2$, $\theta_3$, $\theta_4$ obtained by shifting a data by 90° each in a space orthogonally formed by an I channel and a Q channel. As shown in FIG. 4B, similarly the synchronizing word series Sk multiplied by 0.5 and output from the coefficient multiplier 17 is a data indicating any one of four values shifted by 90° each. Each of the four values has a half level as compared with that of the information series Xk. Since the transmission series tk obtained by mixing the information series Xk and the synchronizing word series Sk is generated by adding any one of the four vales of synchronizing word to each of the values $\theta_1$, $\theta_2$, $\theta_3$, $\theta_4$ of the original information series Xk, as shown in FIG. 4C, the transmission series tk has any one of four values around each of the four values $\theta_1$, $\theta_2$, $\theta_3$, $\theta_4$. As a result, the transmission series tk has any one of the sixteen values shown in FIG. 4C.

Returning back to FIG. 2, an output signal (transmission series tk) of the adder 15 thus mixed with the synchronizing word is supplied through a transmission filter 18 and a transmission switch 19 to a mixer 20. The mixer 20 mixes the transmission series tk with a transmission channel setting frequency signal output from a frequency synthesizer 21 formed of a PLL circuit to obtain a transmission signal of a desired channel. The transmission signal is amplified by a transmission amplifier 22 and thereafter transmitted from an antenna 23 by wireless. In this case, under the control of a controller (not shown) for controlling transmission at the base station, the transmission switch 19 is opened and closed, the transmission channel is set in the frequency synthesizer 21, and an amplifier output of the transmission amplifier 22 is set. When the transmission switch 19 is opened and closed, the transmission switch is controlled to connect contacts thereof only during a transmission time slot. The transmission channel is set in the frequency synthesizer 21 at every transmission time slot, thereby a proper transmission frequency being set. The amplifier output of the transmission amplifier 22 is set depending upon a state of communication with the mobile station. If the controller determines that the communication state is not satisfactory, then the controller sets a maximum amplification factor. Otherwise, the controller sets an amplification factor which is lower than the maximum amplification factor. Setting of the amplification factor will be described later on.

Arrangement of Communication Data

An arrangement of a frame used for communication between the base station and the mobile station according to this embodiment will be described. In this embodiment, a transmission data is arranged as shown in FIG. 5. Specifically, an interval of one time slot is set to 1.25 msec. An interval 1 msec. of one time slot is set as a transmission and reception period, and the rest of 250 μsec. is set as a guard time. One frame is formed of 16 time slots of slot numbers 0 through 15. An interval of one frame is 20 msec. In this embodiment, a different transmission frequency (transmission channel) is set with respect to each of the time slots of one frame. Therefore, it is necessary for the frequency synthesizer 21 to change a transmission channel setting frequency signal in every time slot. The transmission channel set with respect to every time slot is transmitted to each of the mobile stations by means of a broadcasting information contained in a signal transmitted from the base station. This embodiment employs a TDMA system (time division multiplex access system) in which transmission in a down circuit from the base station and transmission in an up circuit from the mobile station are carried out in a time division fashion. For example, the transmission in the down circuit is carried out in a certain one frame and the transmission in the up circuit is carried out in the next frame, thus communication being completed in two frames. The synchronizing word having the above-mentioned arrangement (see FIG. 3) and inherent in each of the base stations is added to the data during each of the time slot periods.

Figure 6:
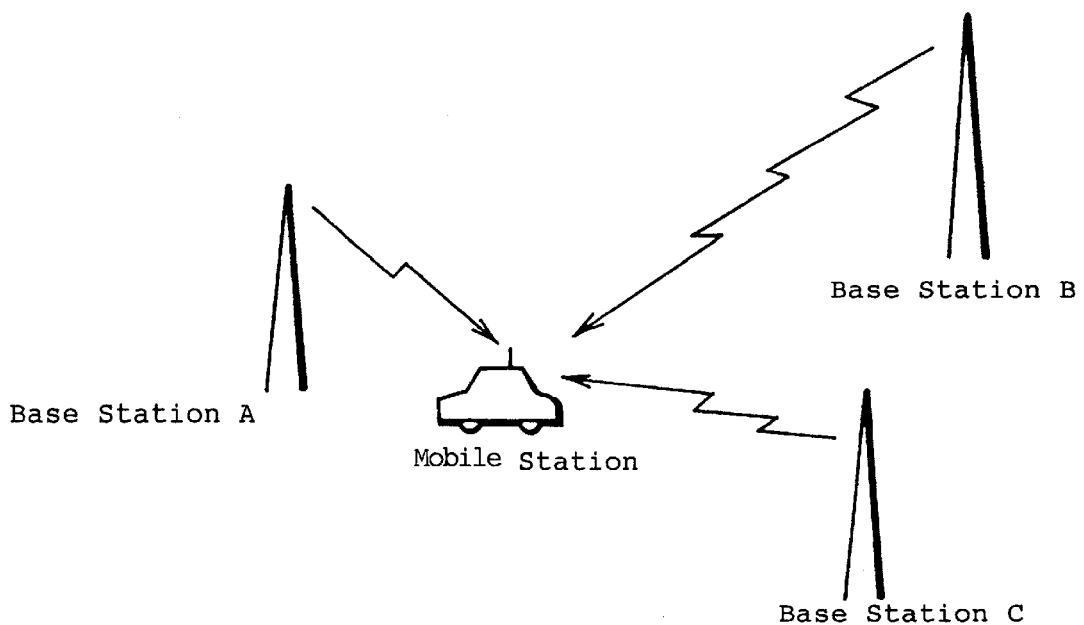
FIG. 6 is an explanatory diagram showing an example of a state of reception at a mobile station according to the embodiment.
Figure 7:
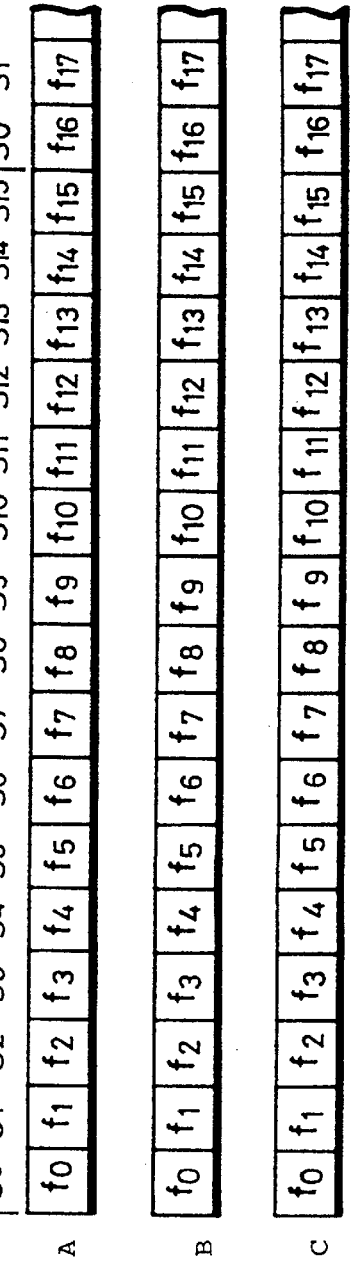
FIGS. 7(A–C) is an explanatory diagram showing allocation of frequency and time slots to each of base stations according to the embodiment.
Figure 8:
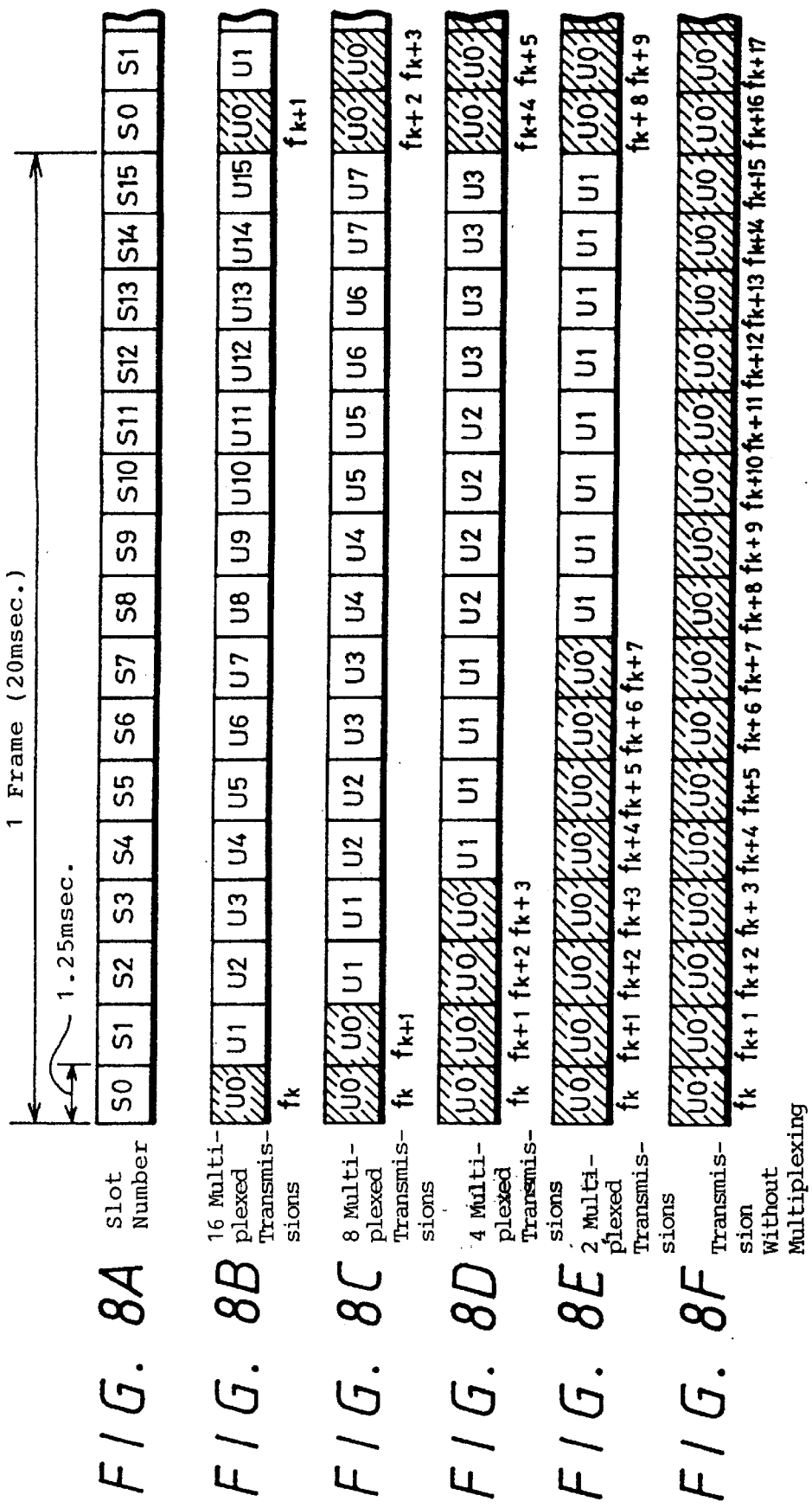
FIGS. 8(A–F) is an explanatory diagram showing a multiplexed state and a used frequency according to the embodiment.
Figure 16:
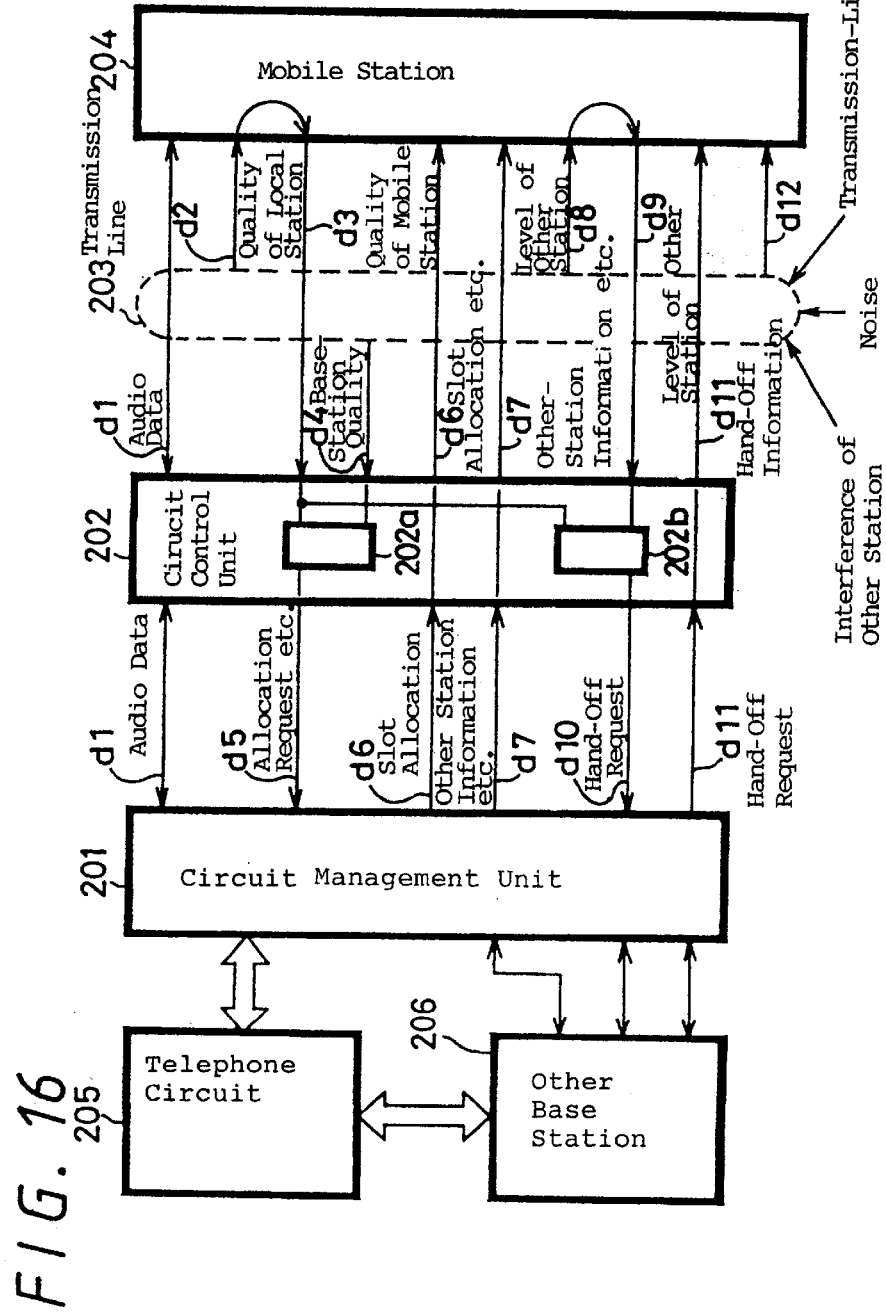
FIG. 16 is a structural diagram showing a transmission state of the information necessary for maintaining the communication according to the embodiment.

The broadcasting information from the base station required for each of the mobile station to obtain an initial synchronization with the base station is transmitted at a synchronized timing. Specifically, assuming that there are three base stations A, B, C adjacent one another, for example, as shown in FIG. 6, frame periods in communication carried out by the respective base stations A, B, C are agreed with one another as shown in FIGS. 7A, 7B, 7C. Each of the base stations transmits the broadcasting information required for obtaining the initial synchronization by using all the time slots in each frame. While the transmission channel is changed in each of the time slot periods, the respective base stations also set the same transmission channel during the same time slot when transmitting the broadcasting information. Specifically, the respective base stations set a transmission channel $f_0$ during a period of the slot number 0 of a certain frame, and set a transmission channel $f_1$ in the next time slot 1. Thereafter, the respective base stations successively changes the transmission channel at every one time slot in an order of transmission channels $f_2, f_3, f_4, \ldots$ When the communication for telephone call between each base station and the mobile station is carried out, the base station controls setting the number of time slots in one frame used for communication. Specifically, when one frame is formed of 16 time slots as shown in FIG. 8A, if the 16 time slots of one frame are respectively used for communication with the mobile stations as shown in FIG. 8B, 16 multiplexed transmissions are carried out on one channel. Reference numerals U0, U1, U2, . . . shown in FIG. 8 represent numbers of the mobile stations for communicating with the base station.

For example, in the case of the 16 multiplexed transmissions, the mobile station denoted by U0 communicates with the base station only during a first time slot period (a period with hatching in FIG. 8B) of each frame. If the transmission channel fk is set during the time slot period for communication of a first frame, a transmission channel fk+1 is set during a time slot for communication of the next frame, and thereafter the transmission channel is successively changed.

If a satisfactory speech quality cannot be obtained in the 16 multiplexed transmissions, then the base station communicates with a specific mobile station by using two time slots of one frame. For example, as shown in FIG. 8C, the mobile station denoted by U0 communicates with the base station by using the first two time slot periods (periods with hatching in FIG. 8C) in each frame. In this case, the same data is transmitted during the two successive time slot periods. The base station successively changes the transmission channel in every time slot for communication with the mobile station denoted by U0 in an order of the transmission channels fk, fk+1, fk+2, fk+3, . . . When two time slots are used per one frame, if the base station communicates with all the mobile stations with using two time slots for each communication, then 8 multiplexed transmissions are carried out on one channel.

If a satisfactory speech quality cannot be obtained in the 8 multiplexed transmissions, then the base station communicates with a specific mobile station by using four time slots of one frame. For example, as shown in FIG. 8D, the mobile station denoted by U0 communicates with the base station by using the first four time slot periods (periods with hatching in FIG. 8D) in each frame. In this case, the same data is transmitted during the four successive time slot periods. The base station successively changes the transmission channel in every time slot for communication with the mobile station denoted by U0 in an order of the transmission channels fk, fk+1, fk+2, fk+3, . . . When four time slots are used per one frame, if the base station communicates with all the mobile stations with using four time slots for each communication, then 4 multiplexed transmissions are carried out on one channel.

If a satisfactory speech quality cannot be obtained in the 4 multiplexed transmissions, then the base station communicates with a specific mobile station by using eight time slots of one frame. For example, as shown in FIG. 8E, the mobile station denoted by U0 communicates with the base station by using the first eight time slot periods (periods with hatching in FIG. 8E) in each frame. In this case, the same data is transmitted during the eight successive time slot periods. The base station successively changes the transmission channel in every time slot for communication with the mobile station denoted by U0 in an order of the transmission channels fk, fk+1, fk+2, fk+3, . . . When eight time slots are used per one frame, if the base station communicates with all the mobile stations with using eight time slots for each communication, then 2 multiplexed transmissions are carried out on one channel.

If a satisfactory speech quality cannot be obtained in the 8 multiplexed transmissions, then the base station communicates with a specific mobile station by using all time slots (i.e., 16 time slots) of one frame. For example, as shown in FIG. 8F, the mobile station denoted by U0 communicates with the base station by using all the time slot periods in each frame. In this case, the same data is successively transmitted during all the sixteen time slot periods. The base station successively changes the transmission channel in every time slot for communication with the mobile station denoted by U0 in an order of the transmission channels fk, fk+1, fk+2, fk+3, . . . When sixteen time slots are used per one frame, transmission without multiplexing is carried out on one communication channel.

While increase of the time slot number has been described, it is needless to say that, conversely, it is possible to reduce the time slot number when the speech quality becomes satisfactory.

While in the arrangement shown in FIG. 8 the successive time slots are used when a plurality of time slots of one time slot are used for communication with one mobile station, any of 16 time slots prepared in one time slot may be used. Since a proper number of time slots used for communication is different depending upon the mobile stations carrying out communication, the number of time slots of one communication channel may be changed depending upon the mobile station. Specifically, the base station may communicate with a certain mobile station by using one time slot per one frame with using the time slot of slot number 0 and communicate with another mobile station by using two time slots per one frame with using two time slots of slot numbers 1, 2. While in the arrangement shown in FIG. 8 the number of time slots used in one frame is set to 1, 2, 4, 8 and 16, the number of time slots may be set to other numbers (i.e., any one of 3, 5, 6, 7, 9, 10, 11, 12, 13, 14 and 15).

While in this embodiment a ratio in time used for communication is changed by changing the number of time slots for communication, the ratio in communication time may be changed by another factors. For example, a redundancy of encoded data may be increased by changing a coding rate at the transmission side when a communication state is not satisfactory, thereby possibility of precise decoding at the reception side being increased.

Combination of the above-mentioned change in number of time slots and change in the coding rate and so on may be employed. Specifically, while in the above embodiment the same data is transmitted in each of the time slots even when transmission is carried out by using a plurality of time slots per one frame, the coding rate, a transmission rate and so on may be set depending upon the number of time slots used for transmission. Specifically, when the number of time slots used for communication becomes double, the coding rate may be reduced to half. A mobile station shown in FIG. 15, which will be described later on, employs transmission arranged by combination of the change in the coding rate and the change in the time slot number.

While in the embodiment described above a communication system is applied to a transmission system of the TDMA system and hence a multiplexing rate is changed by changing the time ratio such as the number of time slots used for communication, in the case of another communication system, it is necessary to control the multiplexing rate suitable therefor. For example, in the case of a communication system of a CDMA system (code division multiplex access system), the multiplexing rate is changed by changing the number of codes used for communication, thereby the transmission rate being improved similarly. In the case of a communication system of an FDMA system (frequency division multiplex access system), the number of frequencies used for communication (i.e., a band used for communication and so on) is changed, thereby the transmission rate being improved similarly.

Arrangement of Mobile Station

Figure 9:
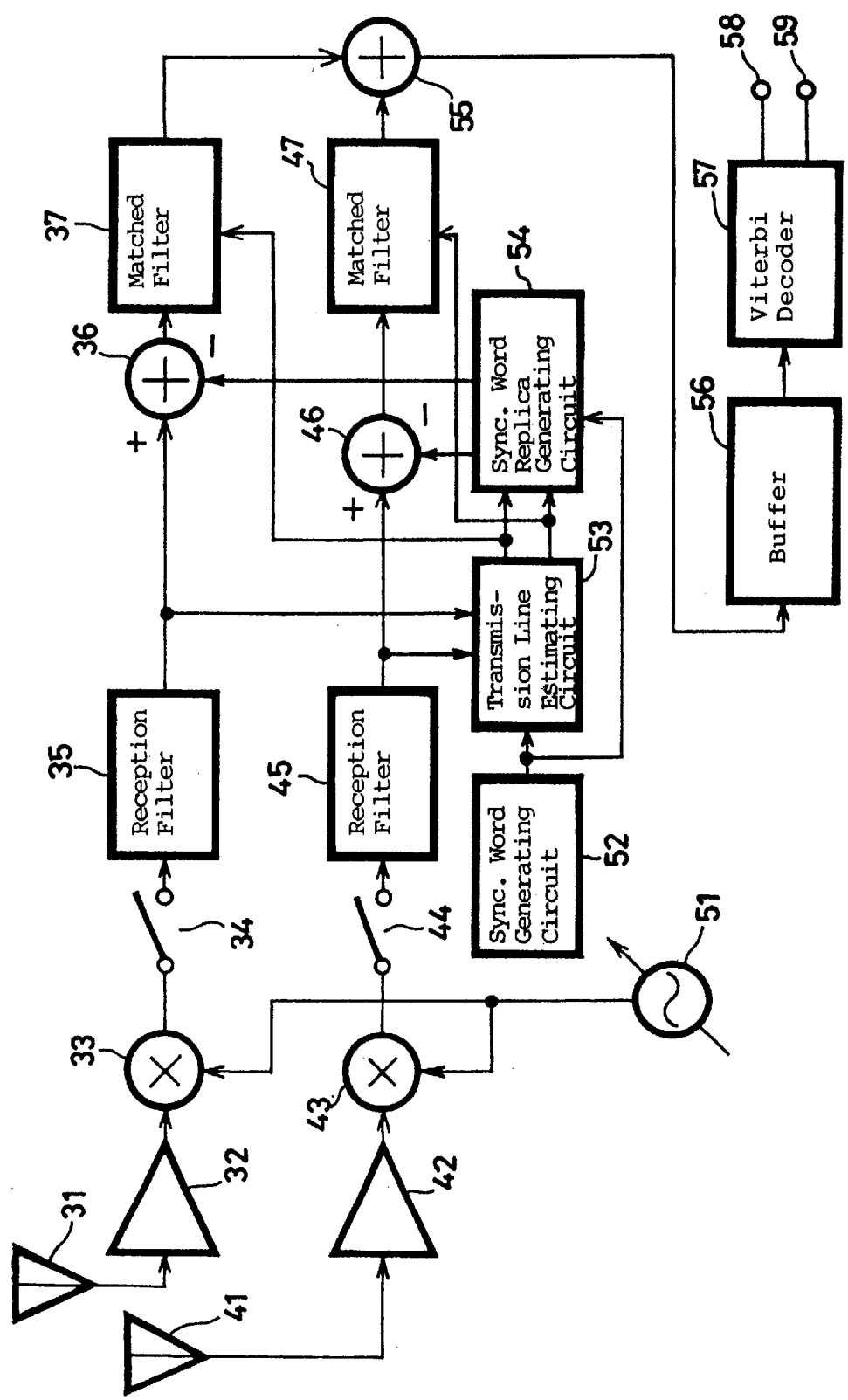
FIG. 9 is a diagram showing an arrangement of the whole reception system of the mobile station according to the embodiment.

FIG. 9 shows an arrangement of a reception system of a mobile station side for communicating with the base station. The mobile station in this arrangement has reception systems of two systems to carry out a diversity reception. In FIG. 9, reference numerals 31 and 41 respectively represent antennas. Signals received by the antennas 31, 41 are respectively supplied through reception amplifiers 32, 42 to mixers 33, 43. The mixers mix the received signals with a reception channel setting frequency signal output from a frequency synthesizer 51 formed of a PLL circuit to obtain intermediate-frequency signals.

The intermediate-frequency signals output from the mixers 33, 43 are respectively supplied through reception switches 34, 44 to reception filters 35, 45 which extract reception data therefrom. In this case, the reception switches 34, 44 are switches for connecting their contacts only during reception time slots, and opened and closed under the control of a slot timing generating circuit (not shown) for controlling a reception operation at the mobile station.

The intermediate-frequency signals output from the reception filters 35, 45 are respectively supplied to subtracters 36, 46. The subtracters 36, 46 subtract the synchronizing words generated on the reception side from the signals to extract only the information series by removing the synchronizing word components from the transmitted signals.

For extracting only the information series, the mobile station has a synchronizing-word generating circuit 52. The synchronizing-word generating circuit 52 generates a $\pi/4$ shift DQPSK modulated data of the synchronizing word of the base station from which the mobile station is receiving the transmitted signal. The synchronizing word data output from the synchronizing-word generating circuit 52 is supplied to a transmission line estimating circuit 53 and a synchronizing word replica generating circuit 54. The intermediate-frequency signals output from the reception filters 35, 45 are supplied to the transmission line estimating circuit 53. The transmission line estimating circuit detects correlation between the synchronizing word thereof and a reference synchronizing word to thereby estimate states of the transmission lines of the respective reception systems. The transmission line estimating circuit supplies data of estimated states of the transmission lines to the synchronizing word replica generating circuit 54 and matched filters 37, 47 of the respective reception systems.

Based on the data of the estimated states of the transmission lines supplied from the transmission line estimating circuit 53, the synchronizing word replica generating circuit 54 generates replicas of the synchronizing words, which are estimated to be obtained upon reception, of the respective reception systems from the synchronizing word supplied from the synchronizing-word generating circuit 52. The synchronizing word replica generating circuit supplies the generated replicas of the synchronizing word to subtracters 36, 46. The subtracters subtract the replicas of the synchronizing words from the received intermediate-frequency signals.

The subtraction of the subtracters 36, 46 removes the synchronizing word components contained in the intermediate-frequency signals. As a result, the output signals of the subtracters 36, 46 contain only the information components. The intermediate-frequency signals having only the information components are supplied to the matched filters 37, 47 of the respective reception systems, respectively. The respective matched filters 37, 47 carry out correction processings for removing transmission line characteristics from the intermediate-frequency signals having only the information components (or processings for correcting phases of the carriers).

The signals corrected by the matched filters 37, 47 of the respective reception systems are supplied to an adder 55 which adds them to obtain a received signal of one system. Alternatively, a changeover switch is provided instead of the adder 55 to select a signal of a more satisfactory reception system.

The received signal output from the adder 55 is supplied to a buffer 56. The buffer carries out a processing to restore the data multiplexed on the transmission side to the data having the original arrangement. The buffer carries out this processing by a slot unit. The received signal processed by the buffer 56 is supplied to a Viterbi decoder 57. The Viterbi decoder demodulates the transmitted information series (bit data) by using a Viterbi algorithm, thereby demodulated data being obtained at an output terminal 58. Simultaneously with the demodulation of the information series, the Viterbi decoder provides a reliability information about the demodulated information, thereby the reliability information being obtained at an output terminal 59. The demodulating processing and the processing for obtaining the reliability information carried out by the Viterbi decoder 57 will be described later on.

An arrangement for obtaining the initial synchronization with the base station in the reception system thus arranged of the mobile station will be described with reference to FIG. 10.

When commencing communication, the mobile station carries out the initial synchronization processing for searching for the base station with which it can communicate from the present position thereof. This operation for searching for the base station is carried out based on the synchronizing word defined with respect to every base station. In this embodiment, since the synchronizing word is superposed on the signal transmitted from the base station, the mobile station detects the synchronizing word component contained in the signal transmitted from the base station to carry out initial synchronization operation based thereon.

Figure 10:
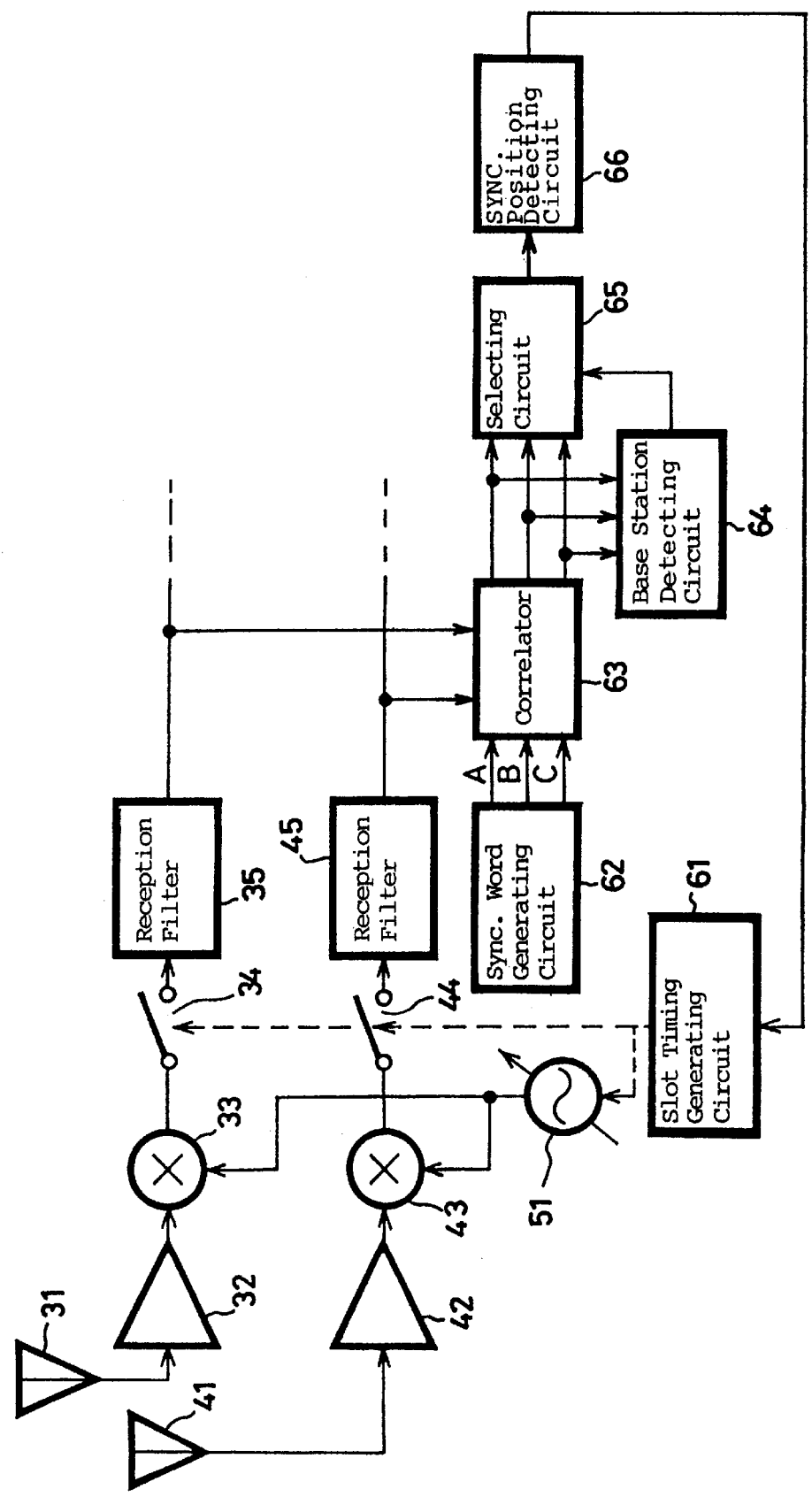
FIG. 10 is a diagram showing an arrangement for initial synchronization of the embodiment shown in FIG. 9.

FIG. 10 shows an arrangement for carrying out this initial synchronization operation. The received signals (intermediate-frequency signals) output from the reception filters 35, 45 of the respective reception systems are supplied to a correlator 63. The correlator 63 is connected with a synchronizing-word generating circuit 62 and hence supplied with the synchronizing word data (modulated data) of the base station, which the mobile station may obtain synchronization with, of a predetermined number (three in this embodiment) from the synchronizing-word generating circuit 62. Assuming that the mobile station is positioned as shown in FIG. 6, for example, and can receive the broadcasting informations from the base stations A, B, C, the synchronizing-word generating circuit 62 supplies the synchronizing word data of the three base stations A, B, C to the correlator 63.

The correlator 63 calculates respective correlations between the supplied received signals and the synchronizing word data of the three base stations A, B, C to obtain data of the correlation values and supplies the data to a base-station detecting circuit 64 and a selecting circuit 65. The base-station detecting circuit 64 detects the system having the highest correlation value and determines that the synchronizing word of the detected system is the synchronizing word of the base station with which the mobile station can communicate most satisfactorily.

For example, when the correlation values with respect to the synchronizing word data of the base stations A, B, C are in states shown in FIG. 11A, 11B, 11C, the correlation value with respect to the base station A is the highest and the correlator determines that the mobile station can communicate with the base station A satisfactorily.

The selecting circuit 65 selects and outputs the correlation value data of the system determined by the base-station detecting circuit 64. The correlation value data output from the selecting circuit 65 is supplied to a synchronizing position detecting circuit 66. The synchronizing position detecting circuit 66 detects a position with the highest correlation value of the supplied correlation value data and set this detected position as a reference synchronizing position. For example, in the example shown in FIG. 11, when the base station A shown in FIG. 11A is selected, the synchronizing position detecting circuit 66 detects a position ta with the highest correlation value of those with respect to the base station A and supplies data of the timing ta to a slot timing generating circuit 61.

Based on the supplied timing data, the slot timing generating circuit 61 determines a time slot period and determines timings for opening and closing the reception switches 34, 44 of the respective reception systems. Under the control of the slot timing generating circuit 61, a timing of switching the reception channel setting frequency signal output from the frequency synthesizer 51 is set.

As described above, the synchronizing word of the base station with which the mobile station can communicate most satisfactorily is detected by the arrangement shown in FIG. 10, and then communication between the base station and the mobile station is commenced in synchronization with the detected synchronizing word. As shown in FIG. 7, each of the base stations has a communication channel of the same allocated frequency and time slot used upon the initial synchronization, and each of the mobile stations previously obtains data of the allocated frequency and time slot used upon the initial synchronization.

An arrangement of the mobile station side for maintaining the communication once commenced as described above will be described with reference to FIG. 12.

Figure 12:
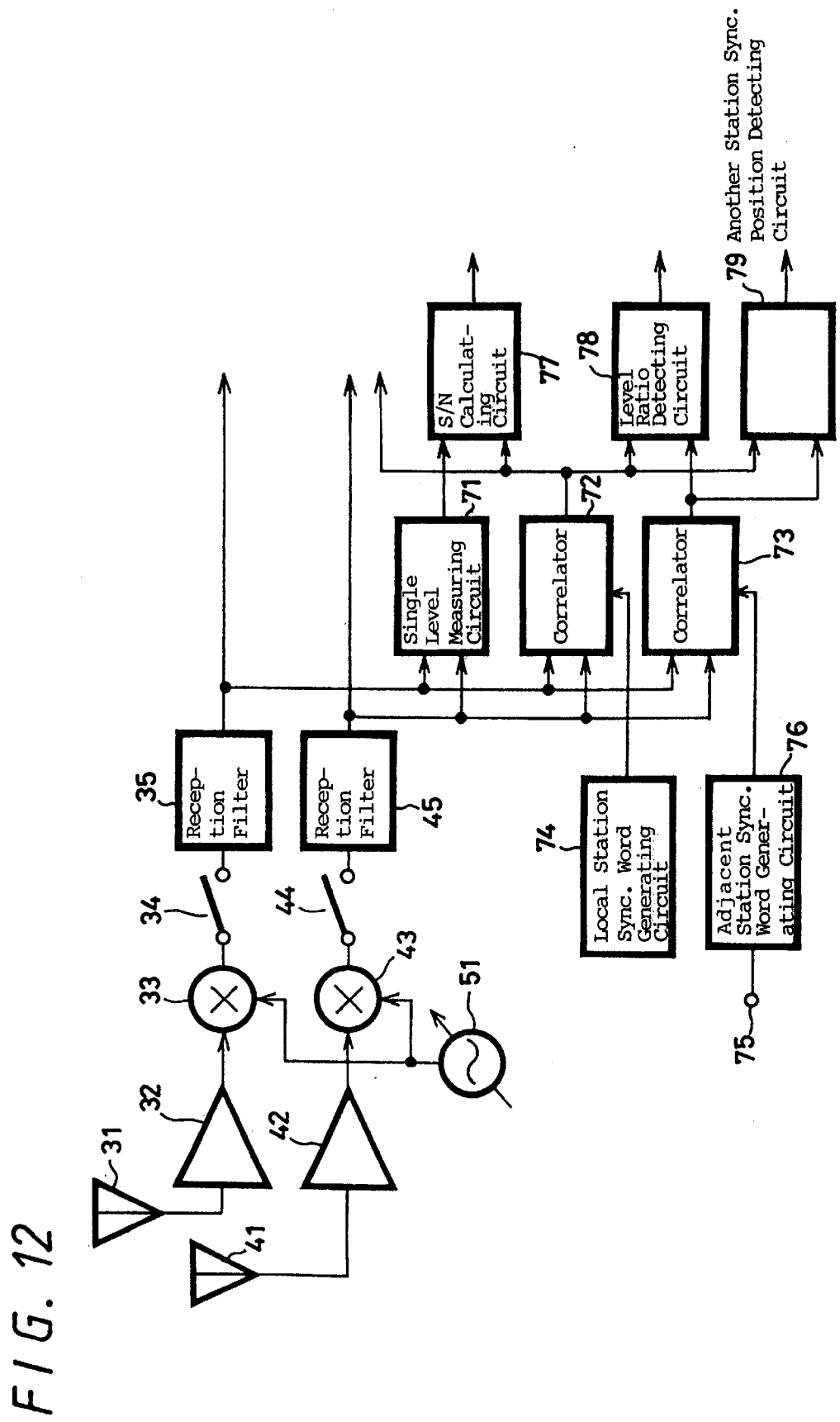
FIG. 12 is a diagram showing an arrangement for detecting information necessary for maintaining communication of the embodiment shown in FIG. 9.

After communication for telephone call between the base station and the mobile station is once commenced, the mobile station monitors the state of the communication with the base station and determines whether or not the communication is satisfactory. FIG. 12 is a diagram showing an arrangement of a reception system for this monitoring. Received signals output from the reception filters 35, 45 of the respective reception systems are supplied to a signal level measuring circuit 71 and correlators 72, 73. The signal level measuring circuit 71 measures levels of the received signals. The correlator 72 is connected with a local station synchronizing-word generating circuit 74 and detects correlation between a modulated signal of the synchronizing word of the local station (the base station with which the mobile station is communicating) output from the synchronizing-word generating circuit 74, and the received signal. The correlator 73 is connected with an adjacent station synchronizing-word generating circuit 76 and detects correlation between a modulated signal of the synchronizing word of the adjacent station (a base station adjacent to the base station with which the mobile station is communicating) output from the synchronizing-word generating circuit 76, and the received signal.

In this case, a communication control unit (not shown) of the mobile station discriminates the synchronizing word information of the adjacent station contained in the broadcasting information transmitted from the base station with which the mobile station is communicating, and supplies the discriminated synchronizing word information through a terminal 75 to the adjacent station synchronizing-word generating circuit 76, thereby the adjacent station synchronizing-word generating circuit 76 generating the synchronizing word of the adjacent base station.

The data of the received signal level measured by the signal level measuring circuit 71 and the correlation value data of the synchronizing word of the local base station detected by the correlator 72 are supplied to an S/N ratio conversion circuit 77. The S/N ratio conversion circuit obtains data of S/N ratio as the data concerning a reception state of the synchronizing word of the local station. The correlation value data of the synchronizing word of the local base station detected by the correlator 72 and the correlation value data of the adjacent base station detected by the correlator 73 are supplied to a level ratio detecting circuit 78 which detects a ratio therebetween. Moreover, the correlation value of the synchronizing word of the adjacent base station detected by the correlator 73 is supplied to an other station synchronizing position detecting circuit 79 which detects a peak position thereof.

The S/N ratio data of the detected synchronizing word of the local base station, the data of the correlation value ratio of the synchronizing words of the local base station and the adjacent base station, and the data of the peak position of the synchronizing word of the adjacent base station are supplied to the communication control unit (not shown) of the mobile station. Based on the S/N ratio of the synchronizing word of the local base station, the communication control unit determines whether or not the sate of the communication with the base station is satisfactory. At this time, if the communication control unit determines that interference of another station or noises are increased (also determines states of another factors of the above data), then a ratio in time required for transmission and reception of data is increased. Specifically, as shown in FIG. 8, the mobile station requests the base station to increase the number of time slots of one frame used for communication. Conversely, if the communication control unit determines that the interference of another station or noises are reduced, then the mobile station requests the base station to reduce the ratio in time used for the transmission and reception (i.e., the number of time slots, etc.).

When the communication control unit determines based on the output data of the level ratio detecting circuit 78 that the correlation value of the synchronizing word of the adjacent base station is higher than the correlation value of the synchronizing word of the local base station, the communication control unit carries out a hand-off processing for switching communication to communication with the adjacent base station. When carrying out the hand-off processing, the mobile station must change communication to the communication synchronized with the synchronizing word of the adjacent base station. The communication control unit of the mobile station carries out the processing for obtaining synchronization with the synchronizing word of the adjacent base station by using the data of the peak position detected by the other-station synchronizing position detecting circuit 79. Specifically, since synchronizing timings indicated by the synchronizing data transmitted from each base stations are slightly different from one another, when the mobile station switches communication to communication with another base station, it is necessary for the mobile station to switch a timing to a timing indicated by the synchronizing data of a base station with which the mobile station is going to communicate. According to this embodiment, since the otherstation synchronizing position detecting circuit 79 is detecting the synchronizing position of another base station, upon the switching the mobile station immediately determines the synchronizing timing of another base station, which enables immediate commencement of precise communication with another base station with which it is going to communicate.

In the system according to this embodiment, the respective base stations basically carries out communication synchronized with one another. However, there occur a delay time in transmission and so on resulting from positional difference between the base stations, so that the transmission timings become different from one another when the respective mobile stations receive signals from the base stations.

Figure 13:
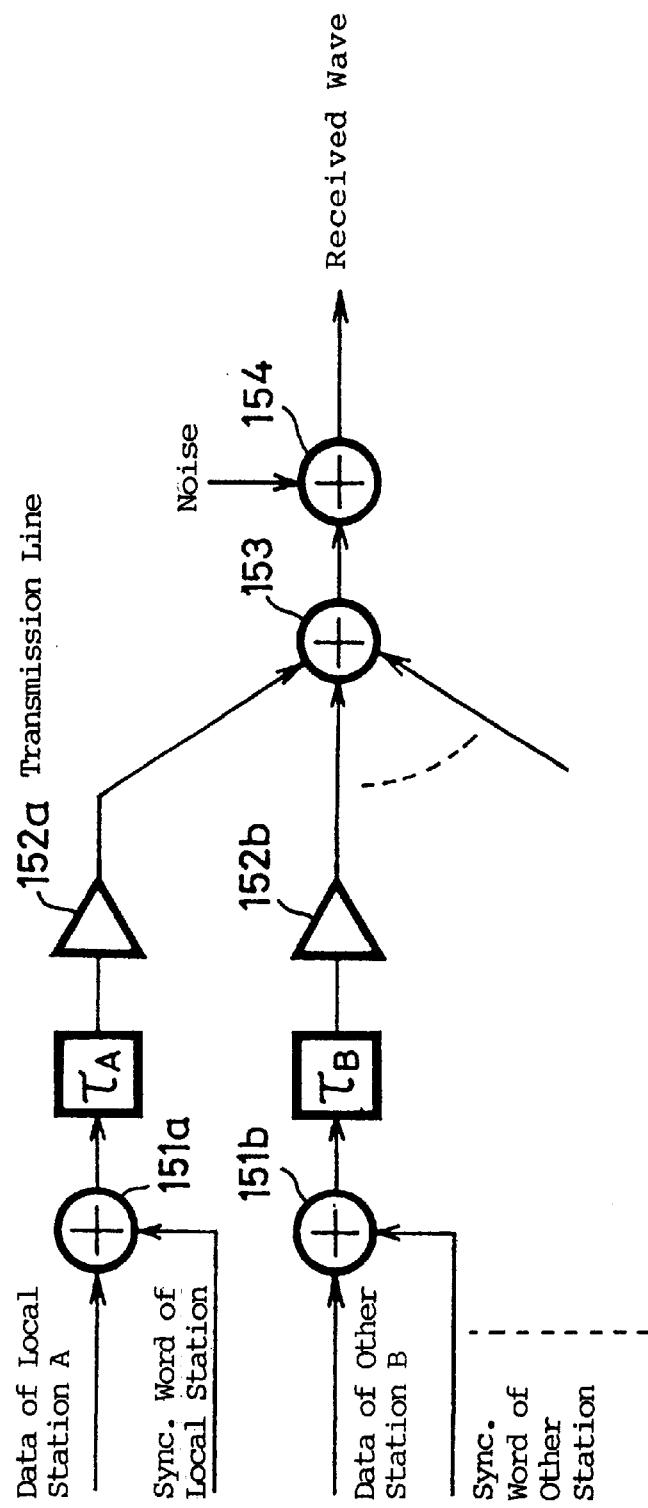
FIG. 13 is a structural diagram showing an example of a model of interference of another base station and a received wave affected by a noise according to the embodiment.

FIG. 13 shows a communication model illustrating how interference wave from another base station is superposed on a received wave from the local base station. A transmission information from the local base station A is added by an adder 151*a* of a local base station with a synchronizing word and then transmitted. The transmission information with a propagation delay $\tau_A$ passes through a predetermined transmission line 152*a*. A transmission information from another base station B is added with by an adder 151*b* of the base station with a synchronizing word and then transmitted. The transmission information with a propagation $\tau_B$ passes through a predetermined transmission line 152*b*. The transmitted waves from the respective base stations are added (by an adder 153) and further added (by an adder 154) with a noise to generate a received wave.

Figure 14:
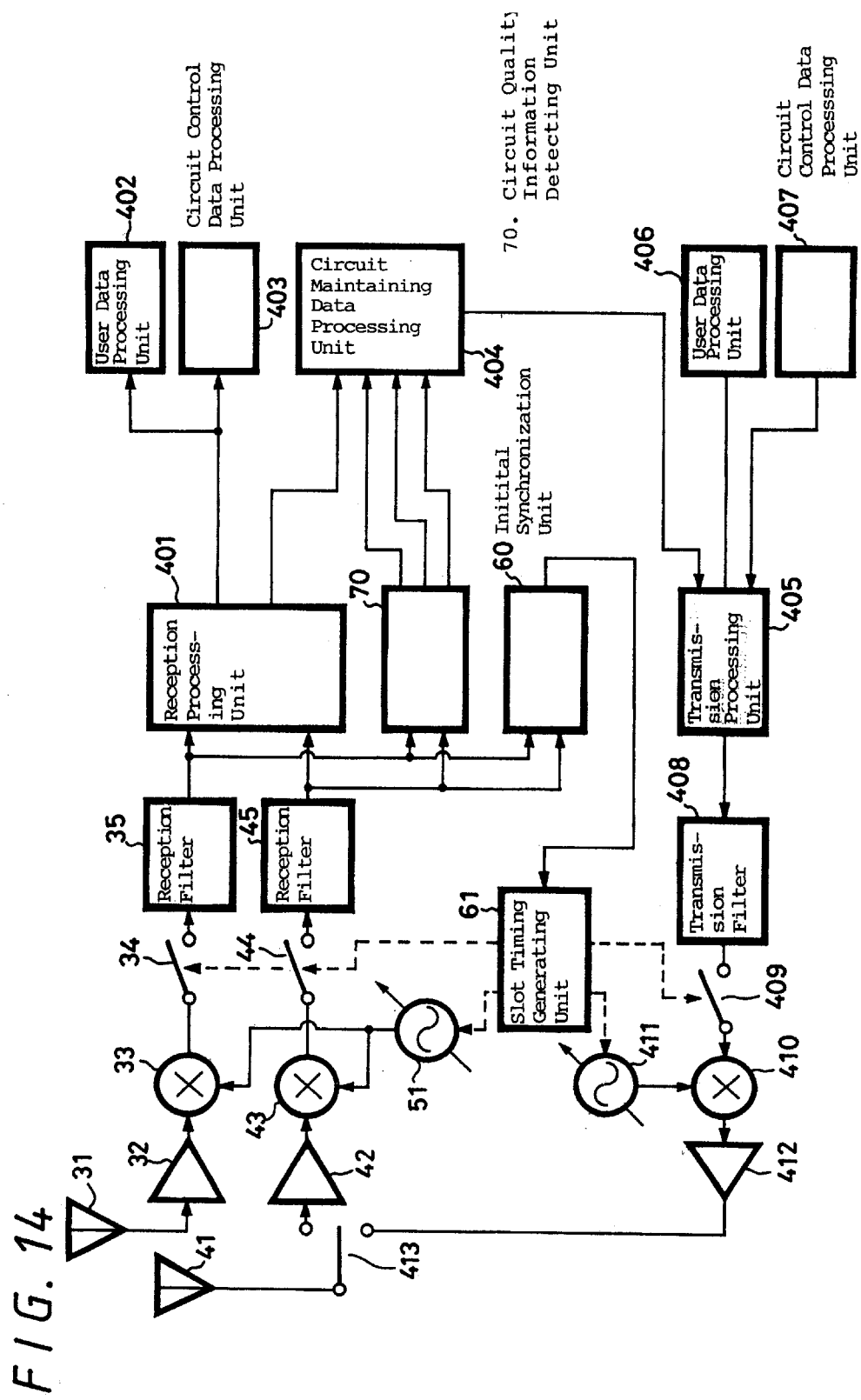
FIG. 14 is a diagram showing an arrangement for transmitting data detected by the mobile station.

An arrangement for transmitting data detected in the mobile station to the base station side will subsequently be described with reference to FIG. 14. Of the reception antennas 31, 41 of two systems, the antenna 41 is also used as a transmission antenna. Between the antenna 41 and the reception amplifier 42, a changeover switch 413 for switching a system to transmission or reception is connected.

Received signals output from the reception filters 35, 45 are supplied to a reception processing unit 401. The reception processing unit demodulates received data and supplies a user data such as an audio data or the like of the received and demodulated data to a user data processing unit 402 which carries out an audio output processing and so on. The reception processing unit supplies a control data (a control data from the base station) of the received data to a circuit control data processing unit 403 which carries out control in the mobile station based on the control data.

Output signals of the respective reception filters 35, 45 are supplied to an initial synchronization unit 60 and a circuit quality information detecting unit 70, both of which carry out respective corresponding processings. The initial synchronization unit 60 has an arrangement corresponding to that shown in FIG. 10 from the synchronizing-word generating circuit 62 to the synchronizing position detecting circuit 66 and supplies a detected synchronization position data to the slot timing generating circuit 61. The circuit quality information detecting unit 70 has an arrangement corresponding to the arrangement for detection shown in FIG. 12 and supplies the S/N ratio data, the correlation value data of the local base station and the adjacent base station, and the data of the peak position of the adjacent base station, which are detected by the detecting unit 70, to a circuit maintaining data processing unit 404. The data concerning the reliability of data demodulated by the reception processing unit 401 is supplied to the circuit maintaining data processing unit 404. A processing for detecting data with respect to the reliability will be described later on.

The circuit maintaining data processing unit 404 converts the respective supplied data into the data of a transmission data format and supplies the respective detected data thus converted to a transmission processing unit 405. The transmission processing unit 405 is supplied with the user data such as the audio data or the like from a user data processing unit 406 of a transmission side and supplied with a control data, which is to be transmitted to the base station, from a circuit control data processing unit 407 of a transmission side. The transmission processing unit arranges these supplied data in predetermined positions in each of the transmission time slots to generate data formed of time slots, and thereafter subjects the data formed of time slots to a transmission processing such as modulation or the like.

The transmission processing unit 405 supplies a transmission signal obtained by the transmission processing thereof through a transmission filter 408 and a transmission switch 409 to a mixer 410. The mixer mixes the transmission signal with a frequency signal output from a frequency synthesizer 411 to generate a transmission signal of a predetermined transmission frequency. The transmission signal having the transmission frequency is supplied through a transmission amplifier 412 to the changeover switch 413 and then transmitted by wireless from the antenna 41.

The transmission switch 409 is a switch opened and closed under the control of the slot timing generating circuit 61 and also a switch brought in its closed state only during the transmission time slot period. The output frequency of the frequency synthesizer 411 and the switching of the changeover switch 403 are controlled by the slot timing generating circuit 61. If the reception frequency and the transmission frequency of the mobile station are the same, then one frequency synthesizer can serve as both of the frequency synthesizer 51 of the reception system and the frequency synthesizer 411 of the transmission system.

Figure 15:
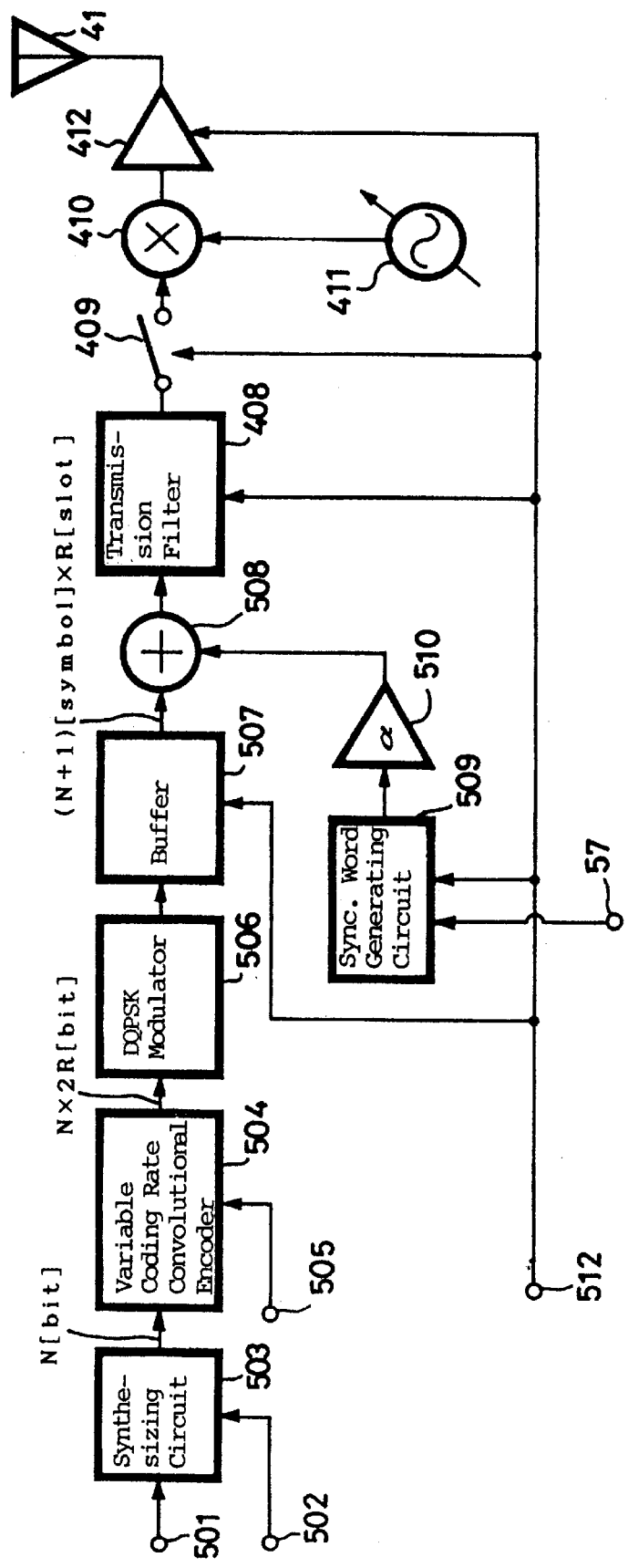
FIG. 15 is a diagram showing an arrangement of the whole transmission system of the mobile station according to the embodiment.

The transmission processing at the mobile station will be described with reference to FIG. 15. An audio data (including the accompanying control data) obtained at a terminal 501 and a circuit maintaining data (data output from the circuit maintaining data processing unit 404 shown in FIG. 14) obtained at a terminal 502 are supplied to a synthesizing circuit 503. The synthesizing circuit synthesizes these data to produce data formed of N bits per one time slot, and thereafter supplies the N bit data to a variable coding rate convolutional encoder 504. The coding rate of the convolutional encoder 504 is determined based on a coding rate setting data (included in the control data transmitted from the base station) obtained at a terminal 505. The coding rate is set to 1/2R (R is an arbitrary integer) and an encoded data is formed of (N×2R) bits. For example, the encoding rate of 1/2, 1/4, 1/8, 1/16 or the like is selected.

A DQPSK modulator 506 π/4 shift DQPSK modulates the data of (N×2R) bits output from the convolution encoder 504 and supplies the modulated signal to a buffer 507. The buffer 507 is a circuit for converting the modulated signal into data of the number of time slots transmitted in one unit and supplies the transmission data of (N+1) [symbols]×R [time slots] to an adder 508. An output timing of the buffer 507 is set as a timing based on a transmission timing data supplied thereto from the slot timing generating circuit 61 (see FIG. 14 etc.) through a terminal 512. The number of time slots in one unit is changed depending upon the coding rate of the encoder 504.

A coefficient multiplier 510 multiplies a synchronizing word output from a synchronizing-word generating circuit 509 by a coefficient a (e.g., $\alpha$ is 0.5) and supplies the synchronizing word multiplied by the coefficient to the adder 508. The adder adds the synchronizing word to every transmission data of one time slot. The synchronizing-word generating circuit 509 is supplied with the transmission timing data from the terminal 512 to thereby generate the synchronizing word in synchronization with the time slot timing, and the synchronizing-word generating circuit 509 is supplied with the synchronizing word data from a terminal 511 to generate the synchronizing word of the base station with which the mobile station is communicating.

The transmission data added with the synchronizing word by the adder 508 is supplied through the transmission filter 408 and the transmission switch 409 to the mixer 410. The mixer mixes the transmission data with the frequency signal output from the frequency synthesizer 411 to generate the transmission signal of a predetermined transmission frequency, and supplies the transmission signal through the transmission amplifier 412 to the antenna 41. The transmission signal is transmitted therefrom by wireless.

FIG. 16 shows a transmission state of information necessary for maintaining communication between the base station and the mobile station in the radio telephone system according to this embodiment. It is assumed that communication is being carried out between the base station A and a mobile station a. The base station A includes a circuit management unit 201 and a circuit control unit 202 for controlling the mobile station and communicates with a mobile station 204 (the mobile station a) through a transmission line 203. The circuit management unit 201 of the base station A is connected to a telephone circuit 205 such as an ISDN circuit or the like, and also connected to another base station 206 to transmit information concerning a hand-off processing.

An audio data d1 as a telephone call data supplied through the telephone circuit 205 is transmitted through the circuit management unit 201 and the circuit control unit 202 to the mobile station 204, and the audio data d1 is also transmitted from the mobile station 204 to the telephone circuit 205 conversely. At this time, the mobile station 204 detects a local station quality d2 from a state of a received signal and then transmits it as a mobile station quality information d3 to the circuit control unit 202. The circuit control unit 202 obtains a base station quality information d4 from a state of a received signal. The circuit control unit 202 supplies the respective station quality data to a quality comparing unit 202a provided therein. The quality comparing circuit determines which of the data is worse in quality.

The circuit control unit 202 determines contents of the communication quality information and transmits to the circuit management unit 201 information d5 of request for setting a communication multiplexing rate (in this case the multiplexing rate is a ratio in time corresponding to the number of time slots to be used) such as a request for allocating a time slots necessary for communication (increase or decrease of the number of time slots) or the like. Based on this request, the circuit management circuit permits the circuit control unit 202 to allocate a free predetermined time slot to communication with the mobile station 204. The circuit control unit 202 transmits a set time slot allocation information and so on as a broadcasting information d6 to the mobile station 204.

An another station information d7 such as information of a synchronizing word of the another base station 206 or the like is transmitted through the circuit management unit 201 and the circuit control unit 202 to the mobile station 204 as the broadcasting information, thereby the mobile station side obtaining information necessary for measuring a level of another base station.

The mobile station 204 detects an another station level d8 from the synchronizing word therefrom and so on and detects a synchronizing timing d12 of another base station. The mobile station transmits another station information d9 of a detected level of another station to the circuit control unit 202. The circuit control unit 202 supplies this another station level data and the base station (local station) level data included in the mobile station quality data to a level comparing unit 202b. If the level comparing unit determines that the level of another station becomes higher, then the circuit control unit determines that the hand-off processing for switching the base station to another base station is necessary. When determining that the hand-off processing is necessary, the circuit control unit transmits information of a hand-off request d10 to the circuit management unit 201. Under the control of the circuit management unit 201, the circuit control unit transmits a hand-off information d11 to the mobile station 204 and carries out a processing for switching the base station in synchronization with a processing at another station 206 side.

A communication control processing thus carried out by the circuit control unit 202 of the base station will be described with reference to FIGS. 17 to 20 which are flowcharts.

Figure 17:
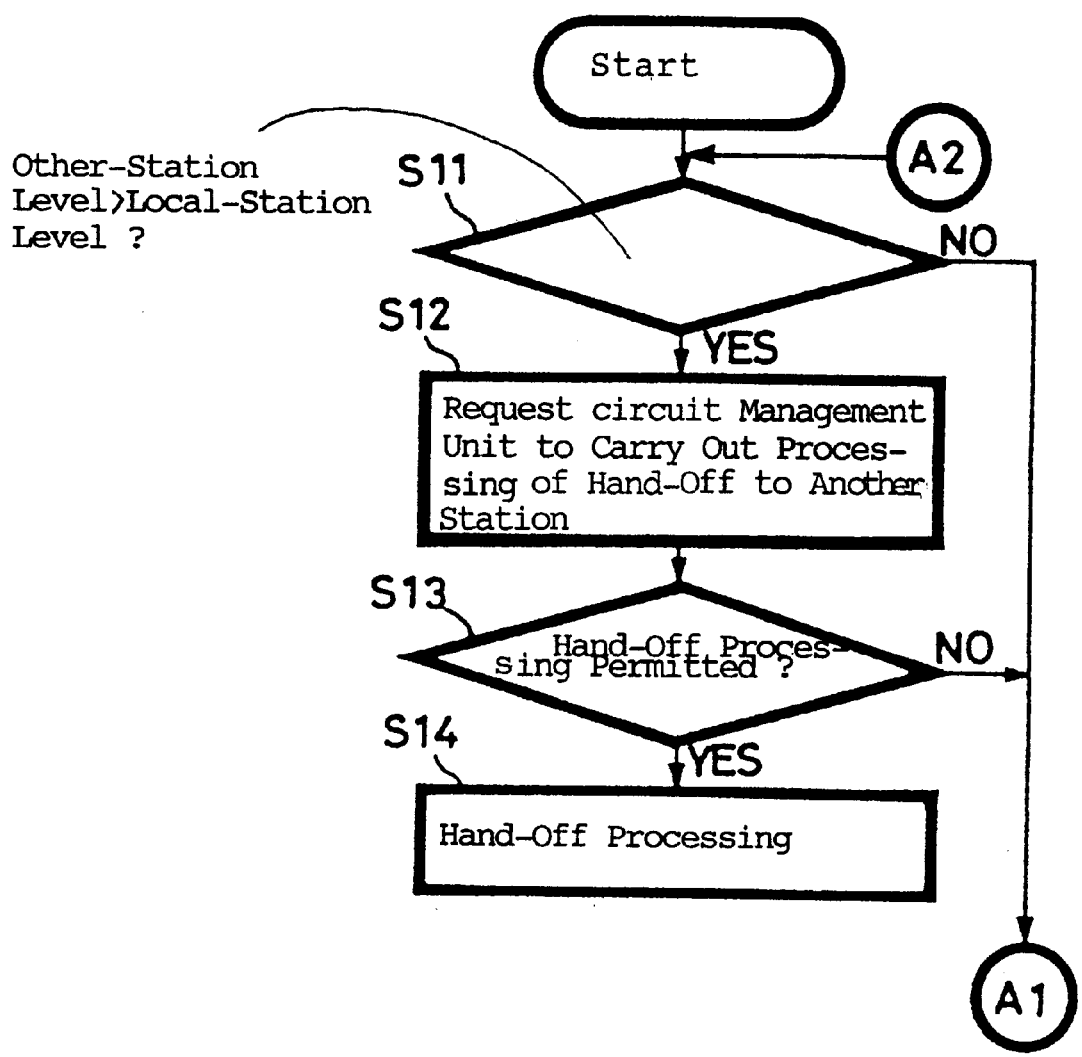
FIG. 17 is a flowchart showing a processing for determining a circuit state according to the embodiment.

As shown in FIG. 17, the level comparing unit 202b initially determines whether or not the level of another base station is larger than the level of the local base station (in step S11). If the level of another base station is larger, the circuit control unit transmits the hand-off request to the circuit management unit 201 (in step S12). The circuit control unit determines whether or not it receives permission for carrying out a hand-off processing from the circuit management unit 201 (in step S13). If it receives the permission of the hand-off processing, then the circuit control unit carries out the hand-off processing for switching the base station to another base station (i.e., another base station determined in step S11) (in step S14).

Figure 18:
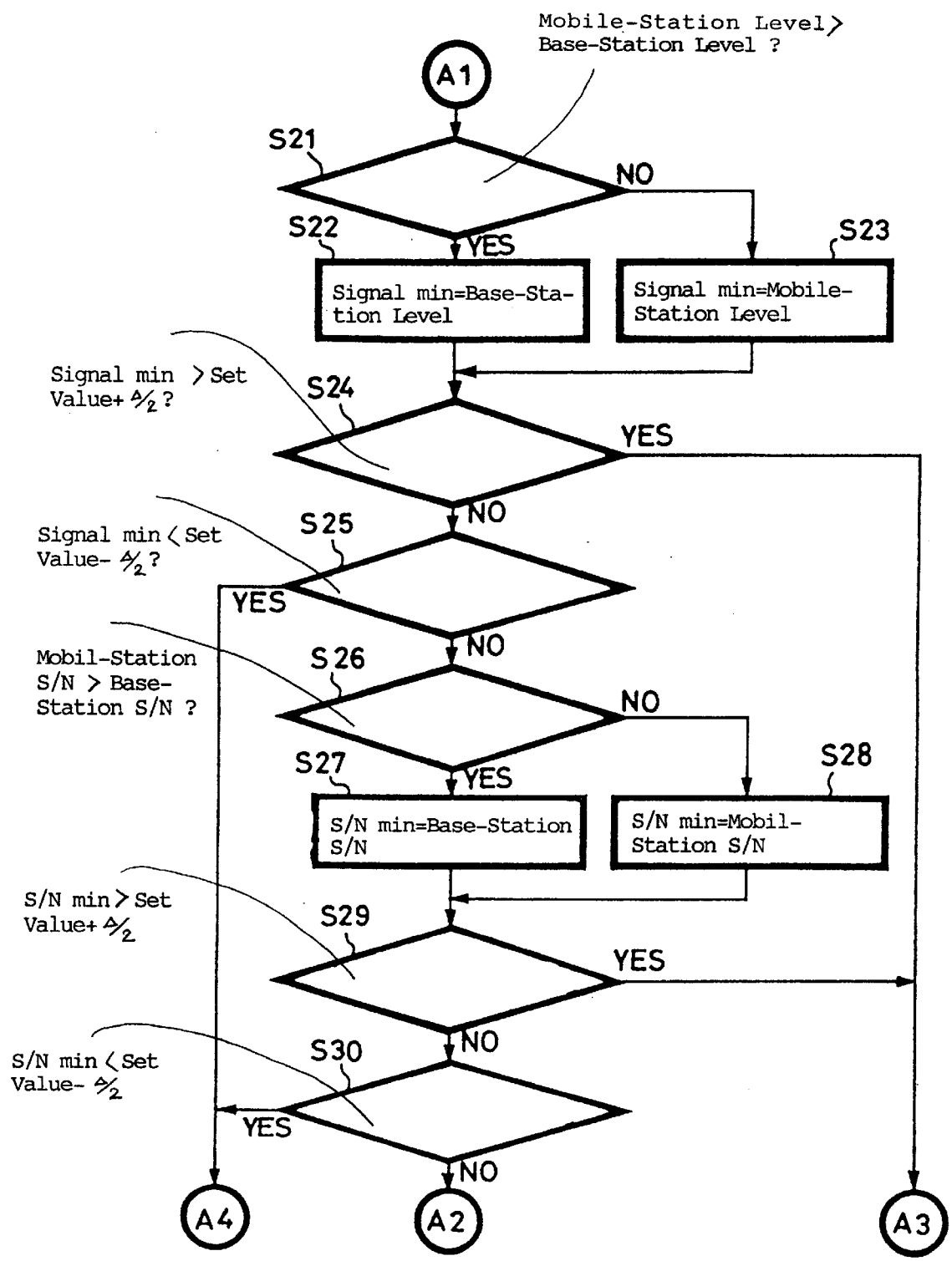
FIG. 18 is a flowchart showing a processing for determining the circuit state according to the embodiment.

If the level comparing unit determines in step S11 that the level of the local station is larger or if the circuit control unit does not receive the permission for carrying out the hand-off processing in step S13, then the processing proceeds to a processing of a flowchart shown in FIG. 18. In this processing, the level comparing unit 202b compares the level of the mobile station and the level of the base station (in step S21). If the level of the mobile station is higher, then the circuit control unit sets a minimum value min of the signal level as the level of the base station at that time (in step S22). If the level of the base station is higher, then the circuit control unit sets the minimum value min of the signal level as the level of the mobile station at that time(in step S23).

The circuit control unit determines whether or not the set minimum value min of the signal level is higher than a preset reference value [(set level value+($\Delta$/2)] of a proper signal level (in step S24). If the minimum value is higher than the reference value [set level value+($\Delta$/2)], then the processing proceeds to a processing shown in FIG. 19 which will be described later on. If the minimum value is lower than the value, then the circuit control unit determines whether or not the minimum value is smaller than a value [set level value–

($\Delta/2$)] (in step S25). If the minimum value min of the signal level is smaller than the value [set level value–($\Delta/2$)], then the processing proceeds to a processing shown in FIG. 20 which will be described later on. If the minimum value is larger than the value, then the circuit control unit compares an S/N ratio of the signal received at the mobile station and an S/N ratio of the signal received at the base station (in step S26). If the S/N ratio of the signal received at the base station is lower, then the circuit control unit sets a minimum value min of the S/N ratio as the S/N ratio of the signal received at the base station at this time (in step S27). If the S/N ratio of the signal received at the mobile station is lower, then the circuit control unit sets the minimum value min of the S/N ratio as the S/N ratio of the signal received at the mobile station at this time (in step S28).

The circuit control unit determines whether or not the set minimum value min of the S/N ratio is larger than a preset reference value [set S/N ratio+($\Delta/2$)] of a proper S/N ratio (in step S29). If the minimum value is larger than the value [set S/N ratio+($\Delta/2$)], then the processing proceeds to a processing shown in FIG. 19 which will be described later on. If the minimum value is smaller than the value, then circuit control unit further determines whether or not the minimum value min of the S/N ratio is smaller than a value [set S/N ratio–($\Delta/2$)] (in step S30). If the minimum value min of the S/N ratio is smaller than the value [set S/N ratio–($\Delta/2$)], then the processing proceeds to a processing shown in FIG. 20 which will be described later. If the minimum value is larger than the value, then the processing returns to the processing of the flowchart shown in FIG. 17.

Figure 19:
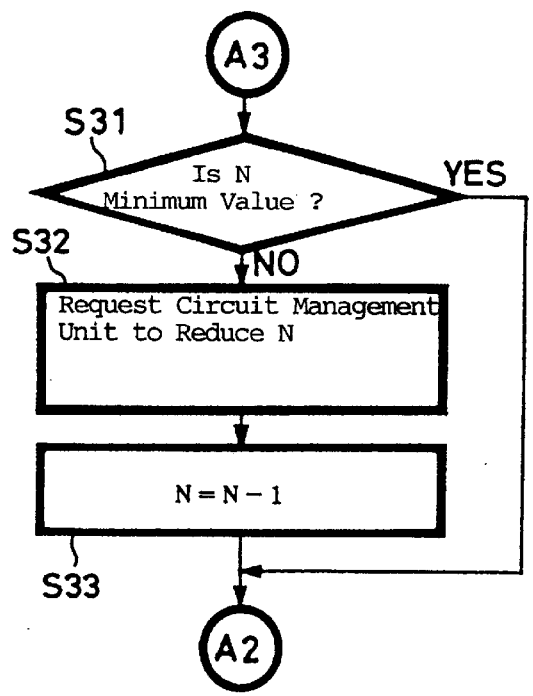
FIG. 19 is a flowchart showing a processing for determining the circuit state according to the embodiment.

If the circuit control unit determines in step S24 of the flowchart shown in FIG. 18 that the minimum value of the signal level is larger than the preset range of the signal level and if the circuit control unit determines in step S29 thereof that the minimum value of the S/N ratio is larger than the preset range of the S/N ratio, then the processing proceeds to the processing of the flowchart shown in FIG. 19. In the processing, the circuit control unit determines whether or not the number N of time slots being used which is the ratio in time used for transmission at present is its minimum value (in step S31). If the number N is the minimum value (i.e., if the number of time slots cannot be reduced any more), then the processing returns to the processing of the flowchart shown in FIG. 17. If the number N is not the minimum value, then the circuit control unit requests the circuit management unit 201 to reduce the number N of the time slots being used at present (in step S32). The circuit management unit 201 sets a new value of the number N as a value obtained by subtracting 1 from the present value of the number N (in step S33) to thereby reduce the number of the time slots being used at present by one time slot. If the coding rate is variable, the coding rate of the transmission data is changed in response to the reduction of the number of the time slots. Thereafter, the processing returns to the processing of the flowchart shown in FIG. 17.

Figure 20:
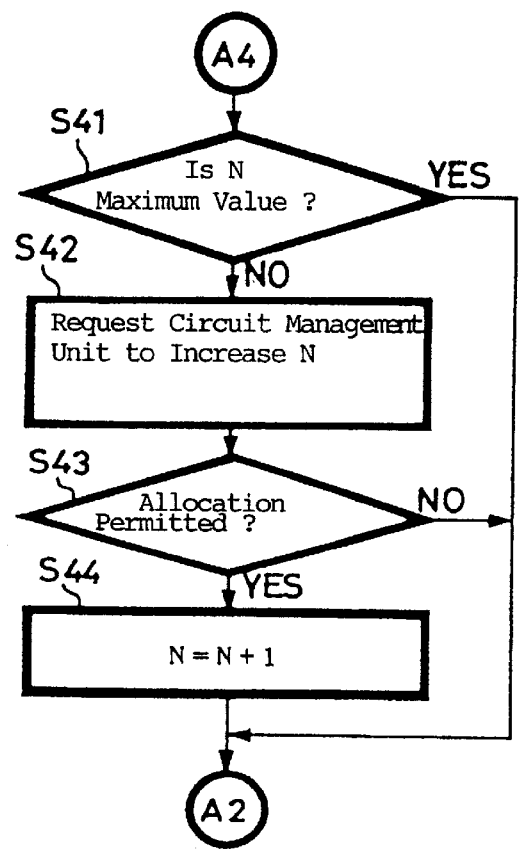
FIG. 20 is a flowchart showing a processing for determining the circuit state according to the embodiment.

If the circuit control unit determines in step S25 of the flowchart shown in FIG. 18 that the minimum value of the signal is lower than the preset range of the signal level and if the circuit control unit determines in step S30 thereof that the minimum value of the S/N ratio is lower than the preset range of the S/N ratio, then the processing proceeds to the processing of the flowchart shown in FIG. 20. In the processing, the circuit control unit determines the number N of the time slots being used which is the ratio in time used for transmission at present is the maximum value (in step S41). If the number N is the maximum value (i.e., the number of the time slots cannot be increased any more), then the processing returns to the processing of the flowchart shown in FIG. 17. If the number N is not the maximum value, then the circuit control unit requests the circuit management unit 201 to increase the number N of the time slots being used (in step S43). The circuit management unit 201 determines whether or not the number of time slots can be increased (i.e., whether or not there is any free time slot) (in step S43). If the number of time slots can be increased, the circuit control unit sets a new value of the number N as a value obtained by adding 1 to the present value of the number N (in step S44) and increases the number of the time slots being used by one time slot. If the coding rate is changed, then the coding rate of the transmission data is also changed in response to the increase of the time slots. Then, the processing returns to the processing of the flowchart shown in FIG. 17.

Explanation of Transmission Characteristics

Figure 21:
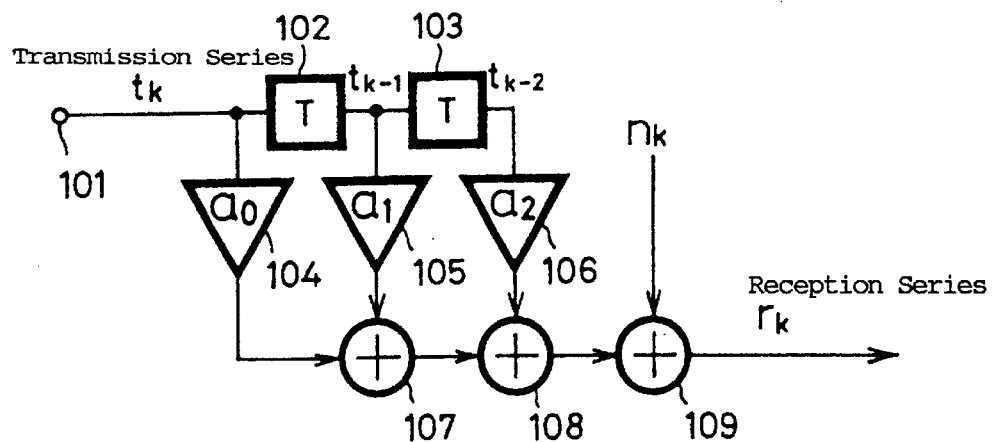
FIG. 21 is a structural diagram showing an example of a model of a transmission line supposed in the embodiment.

Transmission characteristics of communication carried out between the base station and the mobile station in the system according to this embodiment will be described. FIG. 21 shows an example of a model of a transmission line supposed in the system according to this embodiment. A transmission series tk transmitted from the base station and obtained at a terminal 101 is affected by a multipath or the like and becomes symbols tk-1, tk-2 obtained by respectively delaying the transmission series by delay means 102, 103. Coefficient multipliers 104, 105, 106 respectively multiply the transmission series and the symbols by weighting coefficients $a_0$, $a_1$, $a_2$, and the respective multiplied symbols are added to the transmission series by adders 107, 108. The added data is added with an addictive noise nk by an adder 109 to become a reception series rk which reaches the mobile station.

Figure 23:
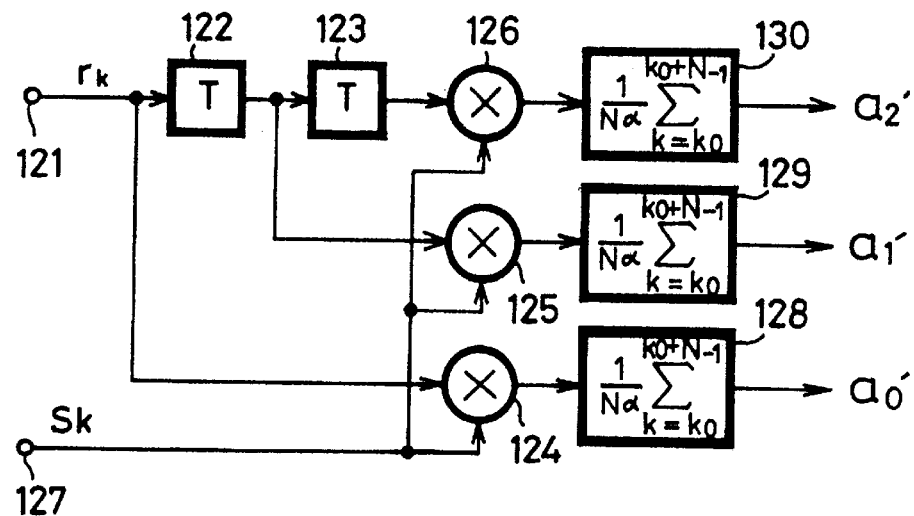
FIG. 23 is a structural diagram showing a transmission-line estimation state according to the embodiment.
Figure 24:
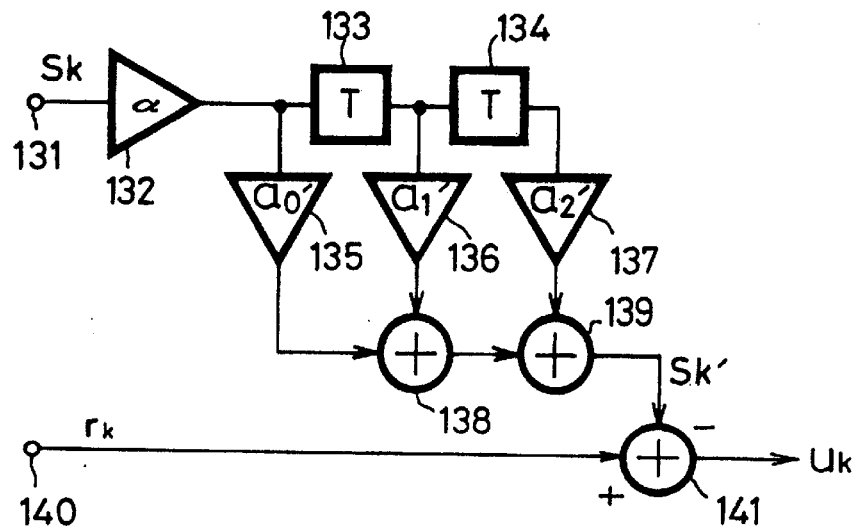
FIG. 24 is a structural diagram showing a synchronizing-word removed state according to the embodiment.

Since the synchronizing word is superposed on the information transmitted from the base station in this embodiment, it is necessary to remove the synchronizing word by estimation of the transmission line when the mobile station receives the information. FIG. 23 shows an arrangement for estimation of the transmission line upon the reception. The mobile station side detects correlations between a received signal rk obtained at a terminal 121 and a synchronizing word Sk of the base station which is already known. Specifically, the received signal rk obtained at the terminal 121 is successively delayed by delay means 122, 123. The received signal rk which is not delayed and the successively delayed received signals rk are respectively supplied to correlation detectors 128, 129, 130 which detect correlations between the known synchronizing words Sk and the synchronizing words of the received signals. Respective correlation detection values $a_0'$, $a_2'$, $a_2'$ detected by correlation detectors are transmission line estimation values in weighting coefficients $a_0$, $a_1$, $a_2$ of the transmission model shown in FIG. 21.

The Synchronizing word is removed from the received signal by using the detected transmission-line estimation value. Specifically, as shown in FIG. 17, after a coefficient multiplier 132 multiplies the synchronizing word Sk obtained at a terminal 131 of the mobile station as a known data by α (this value α is set the same as the value α: about 0.5 set at the base station side), a transmission line (formed of delay means 133, 134, coefficient multipliers 135, 136, 137, and adders 138, 139) which is the same as the model of the transmission line shown in FIG. 21 is formed to generate a synchronizing word obtained in the same state as the transmission state (i.e., a replica Sk' of the reception synchronizing word). At this time, correlation detection values $a_0'$, $a_1'$, $a_2'$ obtained by estimation of the transmission line are set in the coefficient multipliers 135, 36, 137, respectively. A subtracter 141 subtracts the replica Sk' of the reception synchronizing word which has passed through the transmission line system from a reception signal rk obtained at a terminal 140 to obtain a reception information series uk which does not include the synchronizing word.

Figure 22:
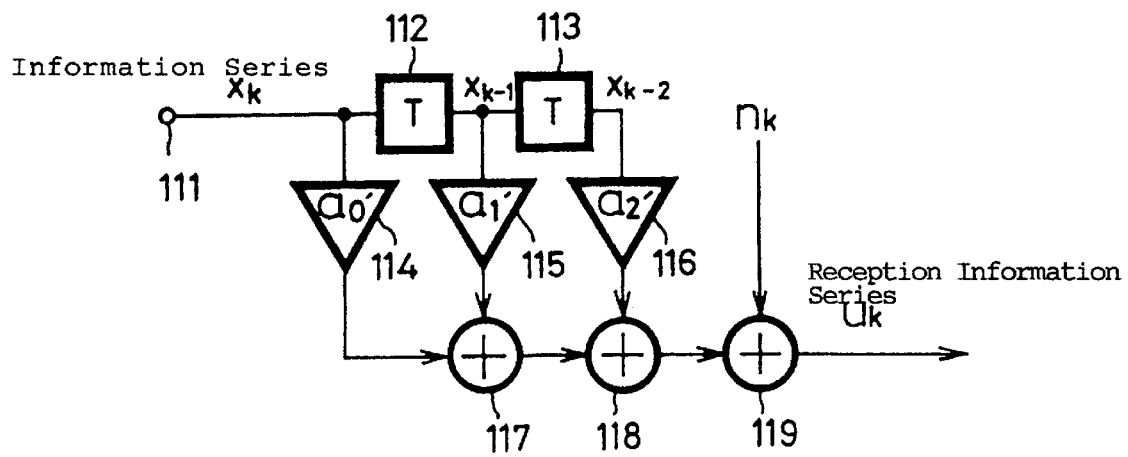
FIG. 22 is a structural diagram showing an example of a model equivalent to a processing in the transmission line supposed in the embodiment.

FIG. 22 shows a model of a transmission and reception system equivalent to the above-mentioned processing. An information series Xk obtained at a terminal 111 is affected by a multipath or the like and becomes symbols Xk-1, Xk-2 obtained by respectively delaying the information series by delay means 112, 113. Coefficient multipliers 114, 115, 116 respectively multiply a signal XK which is not delayed and the delayed signals Xk-1, Xk-2 by estimation values $a_0'$, $a_1'$, $a_2'$ of the transmission line. Adders 117, 118 add the respective multiplied signals to the information series. An adder 119 adds the added data with an addictive noise nk to obtain a reception information series uk.

As described above, according to this embodiment, the transmission line is estimated based on the synchronizing word superposed on the transmission information, and it is possible for the reception side to satisfactorily remove the superposed synchronizing word. If the coefficient α used when the synchronizing word is superposed is set larger, then an accuracy of the transmission-line estimation value becomes satisfactory but a signal transmission power is increased, which results in a wasteful consumption of the power. On the other hand, if the coefficient α is set too smaller, then it leads to lack of the S/N ratio which prevents a satisfactory estimation value from being obtained. Therefore, the coefficient α used to superpose the synchronizing word is most preferably set to about 0.5.

Figure 25:
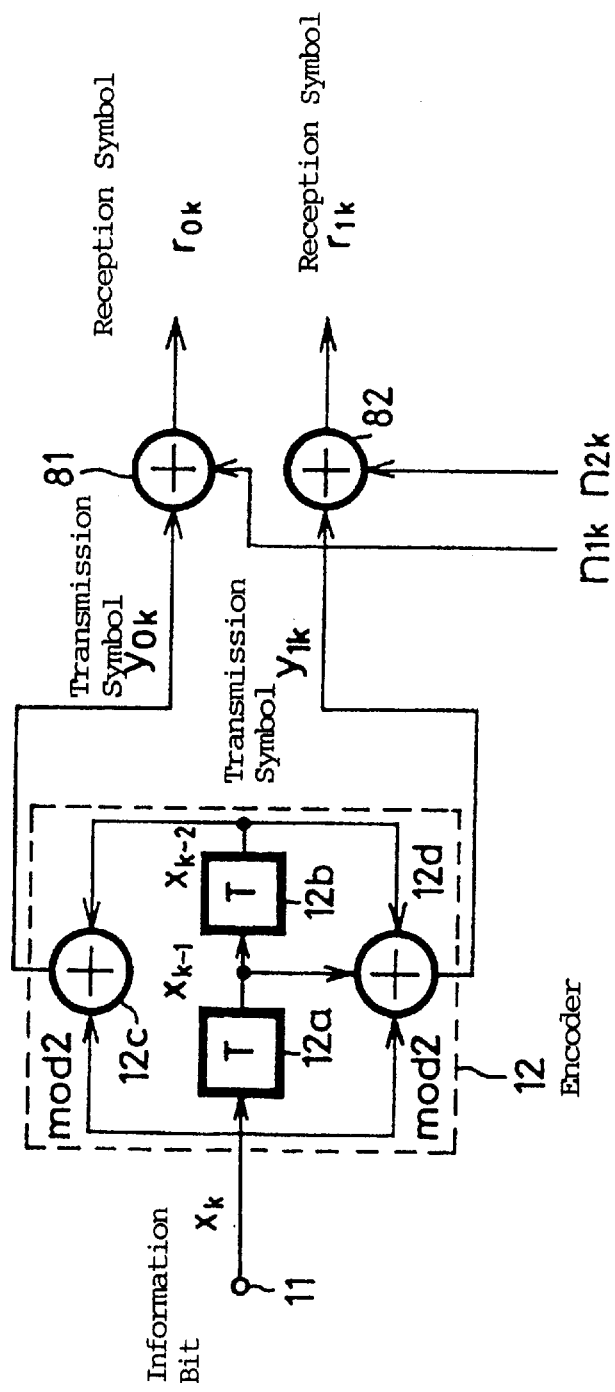
FIG. 25 is a structural diagram showing an example of a convolutional encoder and a model of a transmission line according to the embodiment.

Transmission of convolution-encoded signals in a transmission system according to this embodiment will be described. FIG. 25 shows an example of a convolutional encoder and a model of a transmission line. An information bit Xk, which is a transmission data, supplied from the terminal 11 to the convolutional encoder 12 is input to a shift register formed of delay circuits 12a, 12b connected in series. Adders 12c, 12d generate two symbols $Y_{0k}$, $Y_{1k}$ based on previous information of 2 bits and the two symbols $Y_{0k}$, $Y_{1k}$ are transmitted. The convolutional encoder 12 is a convolutional encoder of K=3 and R=1/2. In the transmission line, adders 81, 82 add a noise or a reception error $n_{0k}$, $n_{1k}$. Then, reception symbols $r_{0k}$, $r_{1k}$ are obtained.

Figure 26:
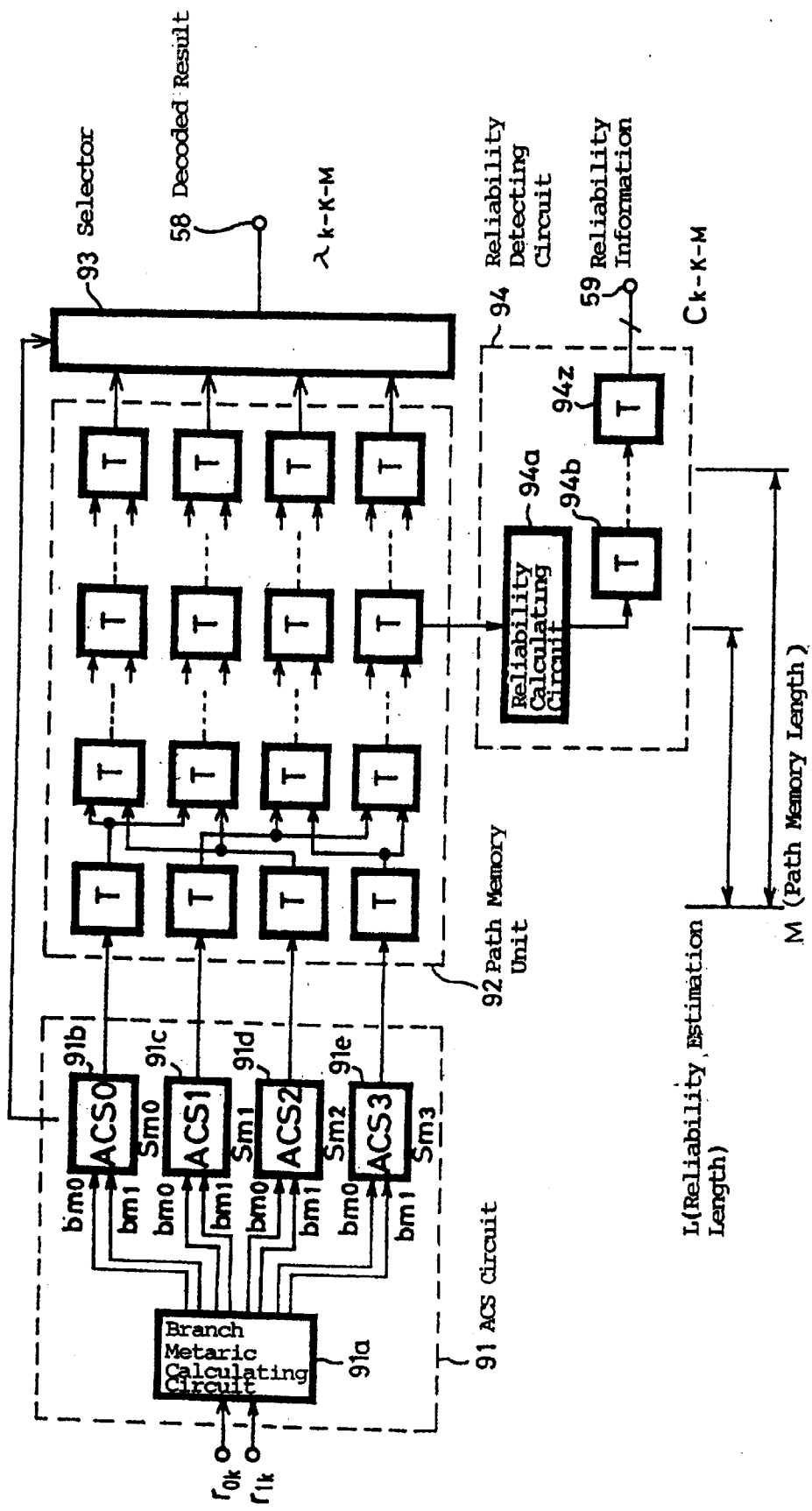
FIG. 26 is a diagram showing an arrangement of a Viterbi decoder according to the embodiment.

An arrangement for demodulating the reception symbols $r_{0k}$, $r_{1k}$ at the reception side will be described. A Viterbi decoder (the decoder 57 shown in FIG. 9) employing a Viterbi algorithm demodulates the reception symbols. FIG. 26 shows an arrangement of the Viterbi decoder. A branch metric calculating circuit 91a provided in an ASC circuit (Add Compare Select circuit) 91 calculates a branch metric bm and supplies the calculated branch metric bm to respective ASC units 91b, 91c, 91d, 91e. Assuming every state of the encoder, the respective ASC units 91b, 91c, 91d, 91e have a state metric Sm which is defined with respect to every state and indicates a likelihood of every state.

The branch metric calculating circuit 91a calculates the branch metric bm based on every state and difference between an encoded symbol of a supposed information bit and actually received symbols $r_{0k}$, $r_{1k}$.

The respective ASC units 91b, 91c, 91d, 91e determine which bit of the information bit supposed with respect to every state is likely to be input, by calculating and comparing the following state metrics $Sm_0$, $Sm_1$:

state metric $Sm_0 = Sm + bm_0$ state metric $Sm_1 = Sm + bm_1$

Based on the comparison, each of the ASC units 91b, 91c, 91d, 91e selects the state metric having a smaller value (i.e., the state metric having more likelihood). The respective ASC units output bits ($Sm_0$, $Sm_1$, $Sm_2$, $Sm_3$) corresponding to the selected states to a path memory unit 92 and supply selection informations to a selector 93.

The path memory unit 92 has a shift register connected at its last stage with the selector 93. The shift registers provided in the path memory unit 92 successively shift the bits supplied from the respective ASC units 91b, 91c, 91d, 91e, and the path memory unit removes a path having no probability of its becoming a maximum path based on the selection information supplied from the ASC units to the selector 93. Therefore, of the bits shifted to the last stage of the path memory unit 92, the bit of the path corresponding to a state with minimum state metric values $Sm_0$ to $Sm_3$ is selected and a decoded result $\lambda_{k\text{-}k\text{-}M}$ is obtained at a terminal 58.

Figure 27:
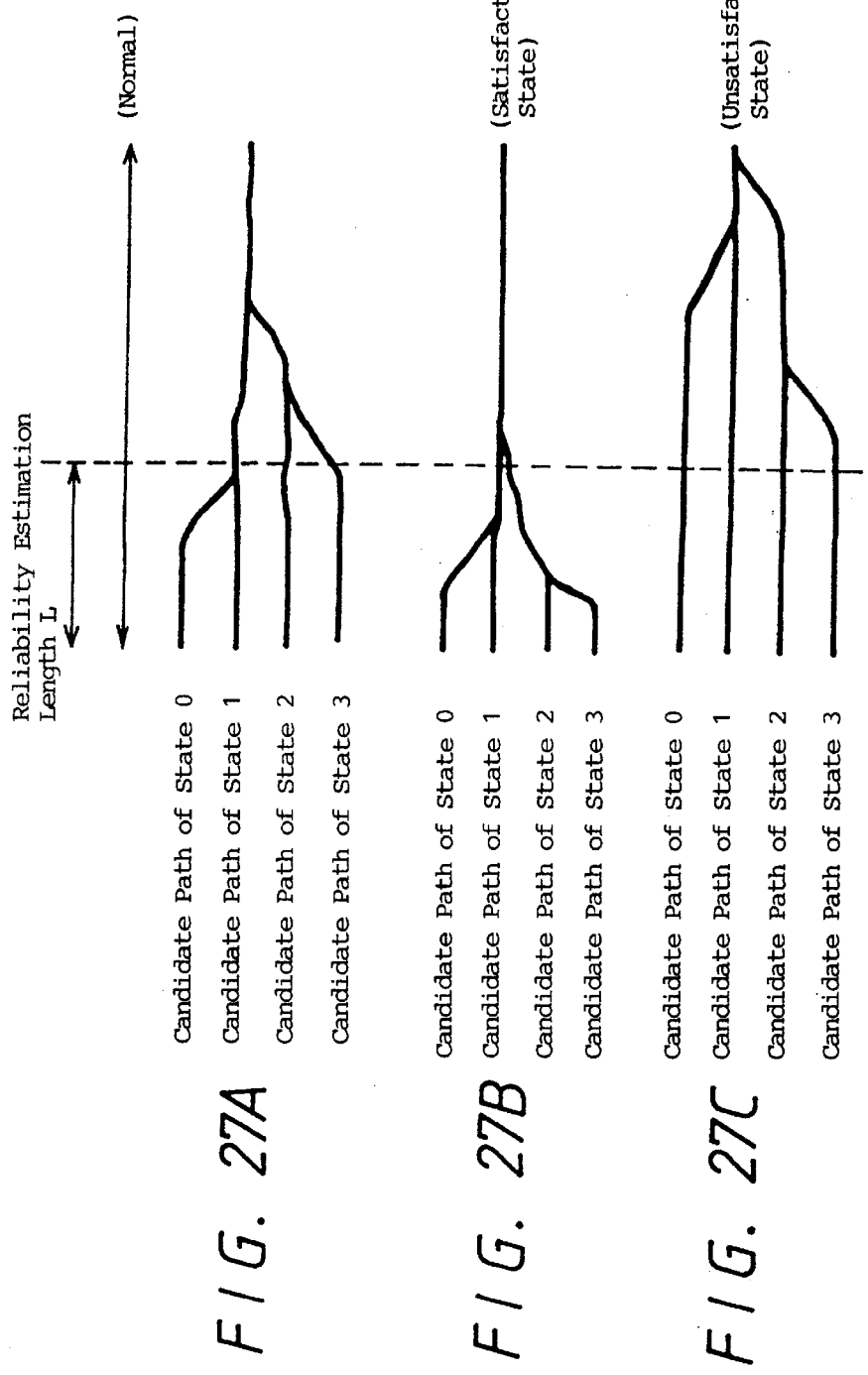
FIG. 27(A–C) is an explanatory diagram showing a state of a candidate path in each state according to the embodiment.

A reliability detecting circuit 94 connected to the Viterbi decoder will be described. Since the path memory unit 92 always shifts and selects the candidate paths so that the path having more likelihood should remain, most of the candidate paths usually have rear path portions most of which are formed of the same series. FIG. 27 shows the above state. Assuming that a path memory length is M, as shown in FIG. 27B, when the transmission line state is comparatively satisfactory, the rear path portions of the candidate paths become the same series at a comparatively early stage. On the other hand, as shown in FIG. 27C, when the transmission line state is comparatively unsatisfactory, determination of which path is to be excluded from the candidate paths is delayed and hence the candidate paths do not become the same series before the end part of the path memory. As shown in FIG. 27A, when the transmission line state is normal, the candidate paths become the same series at a substantially middle portion.

A value of a Lth memory, from the head of the memories, provided at a substantially middle portion of the shift registers forming the path memory unit 92 is supplied to the reliability detecting circuit 94. A reliability calculating circuit 94a provided in the detecting circuit 94 counts the number of values 1 or 0 with respect to every state. If the candidate paths have not become the same series yet at a point of the Lth memory, the number of the values 1 and the number of values 0 are substantially half of all the states, respectively. The reliability calculating circuit 94a calculates the number indicating to which degree the candidate paths becomes the same series, in accordance with the following Equation 1.

$$C_{k\text{-}K\text{-}L} = |(N/2) - n_1| \quad \text{[Equation 1]}$$

where N is the number of states and $n_1$ is the number of values 1.

If the value $C_{k\text{-}K\text{-}L}$ calculated in accordance with the above equation approximates 0, then it is determined that the reliability of the candidate path is low. If on the other hand the value approximates N/2, then it is determined that the reliability is high. Delay circuit series 94b to 94z for delaying a reliability value C calculated by the reliability calculating circuit 94a up to a timing at which data of the Lth memory is output from the output terminal 58 (the number of connection stages of the delay circuits is [path memory length M]–[reliability estimation length L]) are provided in the reliability detecting circuit. The reliability information $C_{k\text{-}K\text{-}L}$ delayed by the delay circuit series is supplied to a terminal 59.

When using the decoded data $\lambda_{k\text{-}K\text{-}M}$ obtained at the terminal 58, the communication control unit (not shown) of the mobile station having the above circuit refers to the reliability information $C_{k-K-L}$ obtained at the terminal 59.

The reliability information $C_{k-K-L}$ may be obtained by averaging several preceding and succeeding data and then supplied to the communication control unit.

Explanation of Influence of Interference of Another Station

Figure 28:
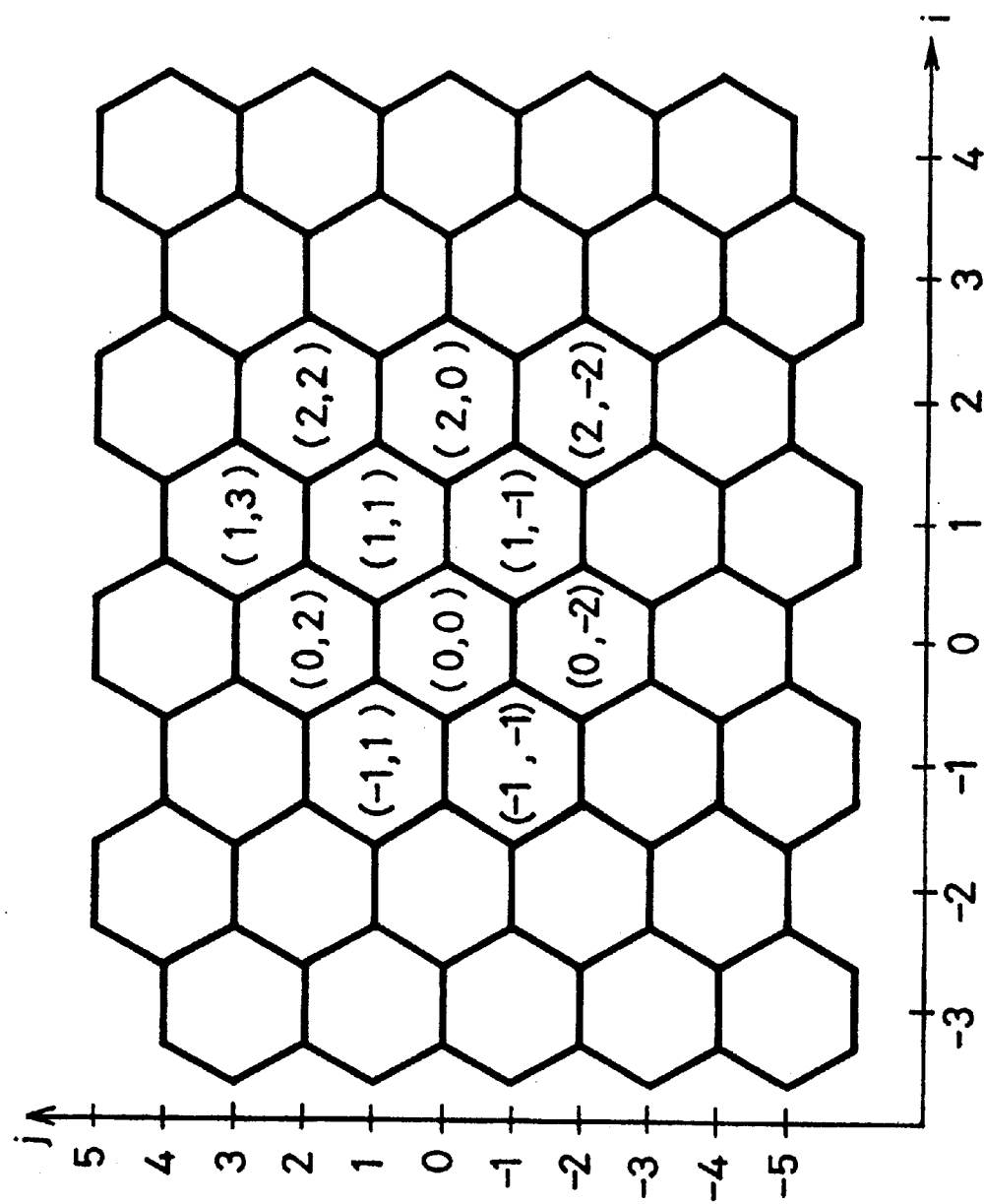
FIG. 28 is an explanatory diagram showing a relationship between a cell location state and an interleaving according to the embodiment.

There will be described influence of interference of another station caused when communication between the base station and the mobile station is carried out in the system according to this embodiment. FIG. 28 shows an example of a location of cells (base station) which can be considered in the system according to this embodiment. In this location, it is assumed that each of the cells has a hexagonal shape and the base station is located at a substantially center portion of each of the hexagonal cells. In the location shown in FIG. 28, a cell marked with (0, 0) and located at a substantial center portion of the location is a reference cell, and numerals in other cells represent distances in the directions i and j from the reference cell. According to this embodiment, a cell located away from the reference cell by a distance satisfying the following Equation 2 can use the same frequency as the reference cell.

$$(3i^2 + j^2) \div 4N = 0 \quad \text{[Equation 2]}$$

where N is an interleaving number.

Figure 29:
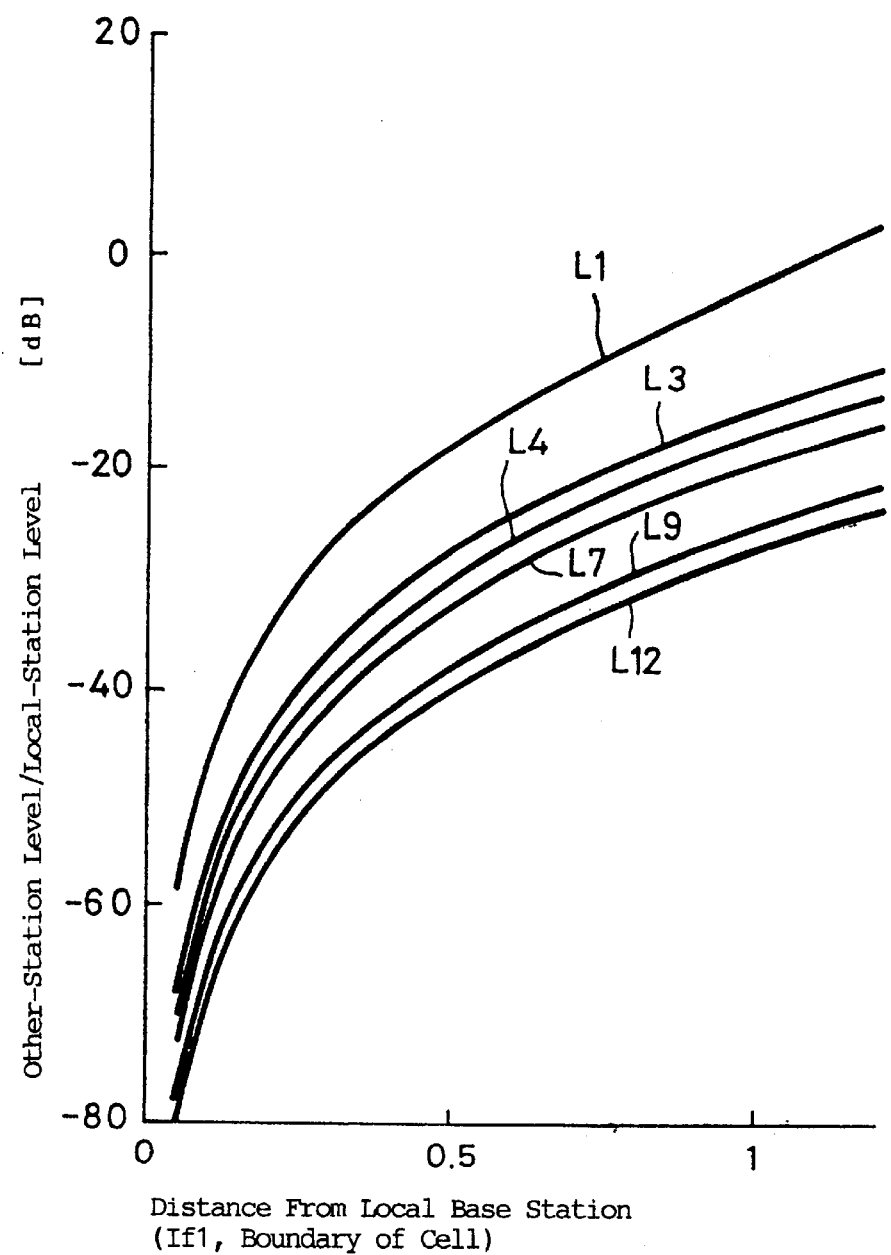
FIG. 29 is a characteristic graph showing an interference state of a down circuit from the base station according to the embodiment.

FIGS. 29, 30 are graphs showing a state of interference of another station. FIG. 29 shows an interference state of a down circuit from the base station to the mobile station measured when transmission output control described later on is carried out. FIG. 30 shows an interference state of an up circuit from the mobile station to the base station, wherein the transmission output is constant. In FIGS. 29, 30, a characteristic curve marked with L1 shows an interference level measured when the same frequency is used for communication in the cell adjacent to the local base station, and characteristic curves marked with L3, L4, L7, L9, L12 respectively show interference levels measured when the same frequency is used for communication in cells of 3rd, 4th, 7th, 9th, 12th stations from the local base station.

The following table 1 shows an S/N ratio required to set a bit error rate (bit error rate) of the data transmitted in the transmission system according to this embodiment to 1%.

TABLE 1

| a | b | c | d | e | f | average (total) |
|---|---|---|---|---|---|---|
| 1 | 16.0 | 12 dB | 0.45 | A1 20% | 3.2 | |
| 2 | 8.0 | 3 dB | 0.7 | A2 30% | 2.4 | 7.33 |
| 3 | 5.3 | 1 dB | 0.85 | A3 20% | 1.06 | [CH/240 kHz] |
| 4 | 4.0 | −1 dB | 0.95 | A4 10% | 0.4 | |
| 6 | 2.7 | −3 dB | 1.0 | A5 10% | 0.27 | (33 kHz/CH) |
| 8 | 2.0 | −5 dB | | | | |
| 12 | 1.3 | −6.5 dB | | | | |
| 16 | 1.0 | −8 dB | | | | | a: the number of used time slots
b: the number of CHs which can be multiplexed
c: S/N ratio [d/B] required to obtain 1% of the bit error rate
d: distance from a cell where C/I exceeding the above S/N ratio can be obtained
e: a ratio of an area of each partition
f: the number of CHs per 240 kHz in each partition The table 1 shows how far the mobile station moves close to the base station for obtaining a bit error rate of 1% when interference of another station lowers the S/N ratio. The table shows the number of used time slots in one frame (see FIG. 8) and the S/N ratio obtained when the time slots of the number are used.

Figure 31:
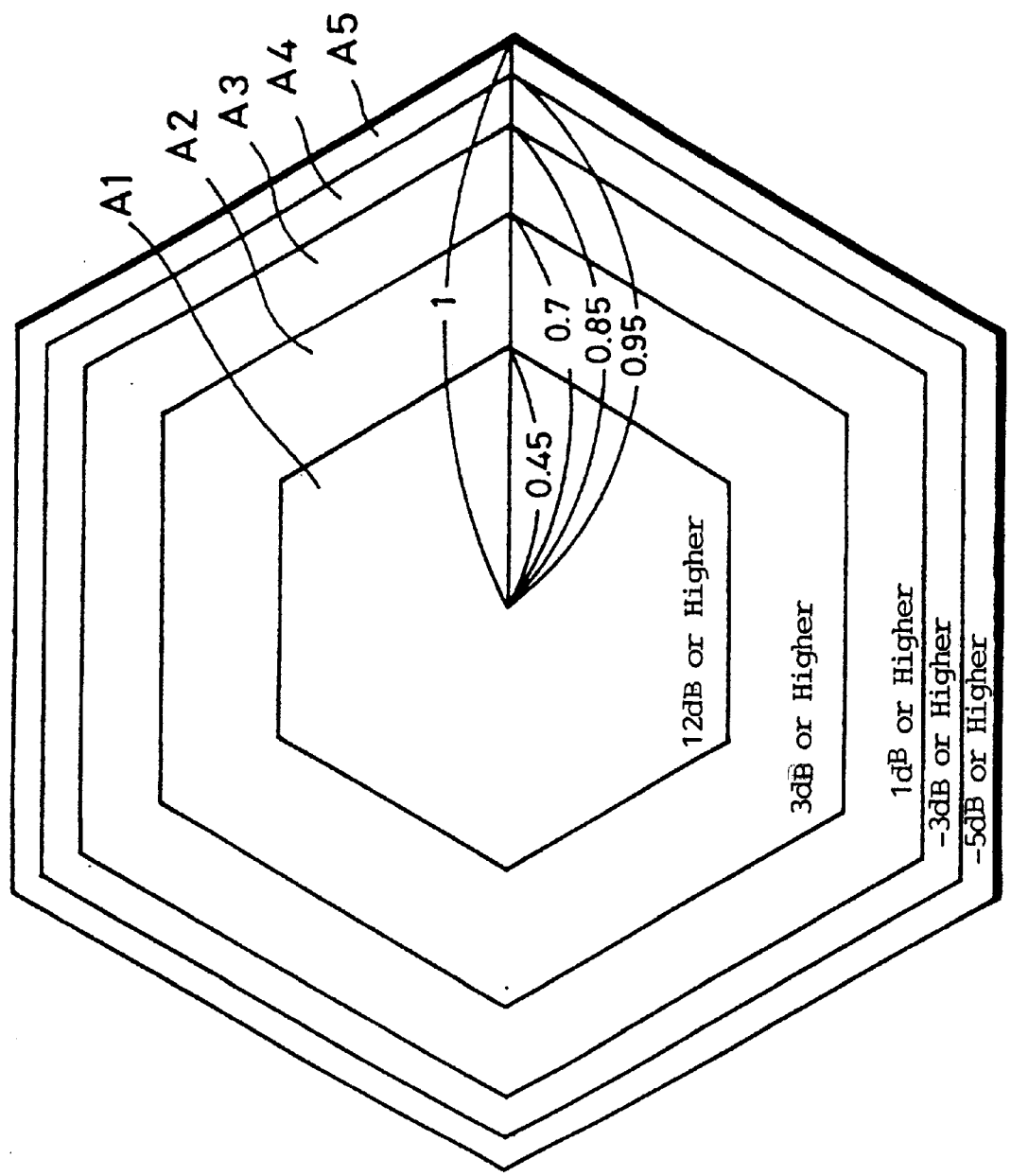
FIG. 31 is an explanatory diagram showing a state of partition of cells according to the embodiment.

FIG. 31 shows partition state of a cell based on the table 1. Assuming that when the base station is located at the center of the hexagonal cell, a distance from the base station to an edge of the cell is defined as 1, a range within a distance of up to 0.45 is an area A1, a range within a distance of 0.45 to 0.7 is an area A2, a range within a distance of 0.7 to 0.85 is an area A3, a range within a distance 0.85 to 0.95 is an area A4, and a range within a distance of 0.95 to 1 is an area A5.

In the area A1, since only one time slot of 16 time slots prepared in one frame is used, 16-channel multiplexed transmission can be carried out, wherein the number of channels per 240 kHz is 3.2. In the area A2, since two time slots in one frame is used, 8-channel multiplexed transmission can be carried out, wherein the number of channels per 240 kHz is 2.4. In the area A3, since three time slots in one frame is used, about 5.3 channel multiplexed transmission can be carried out, wherein the number of channels per 240 kHz is 1.06. In the area A4, since four time slots in one frame is used, 4-channel multiplexed transmission can be carried out, wherein the number of channels per 240 kHz is 0.4. In the area A5, since six time slots in one frame is used, about 2.7-channel multiplexed transmission can be carried out, wherein the number of channels per 240 kHz is 0.27.

A mean value of the numbers of channels in respective divided areas of the whole one cell is 7.33 channels per 240 kHz. A frequency band of only about 33 kHz is required for one channel. If a value of about 33 kHz per one channel of the system according to this embodiment is compared with that of a digital radio telephone system which is put into practice at present, then since a frequency band per one channel is about 105 kHz in a certain digital radio telephone system which has been put into practice in Japan, a frequency utilization efficiency of the system according to this embodiment is about three times as high as the digital radio telephone system.

Figure 1:
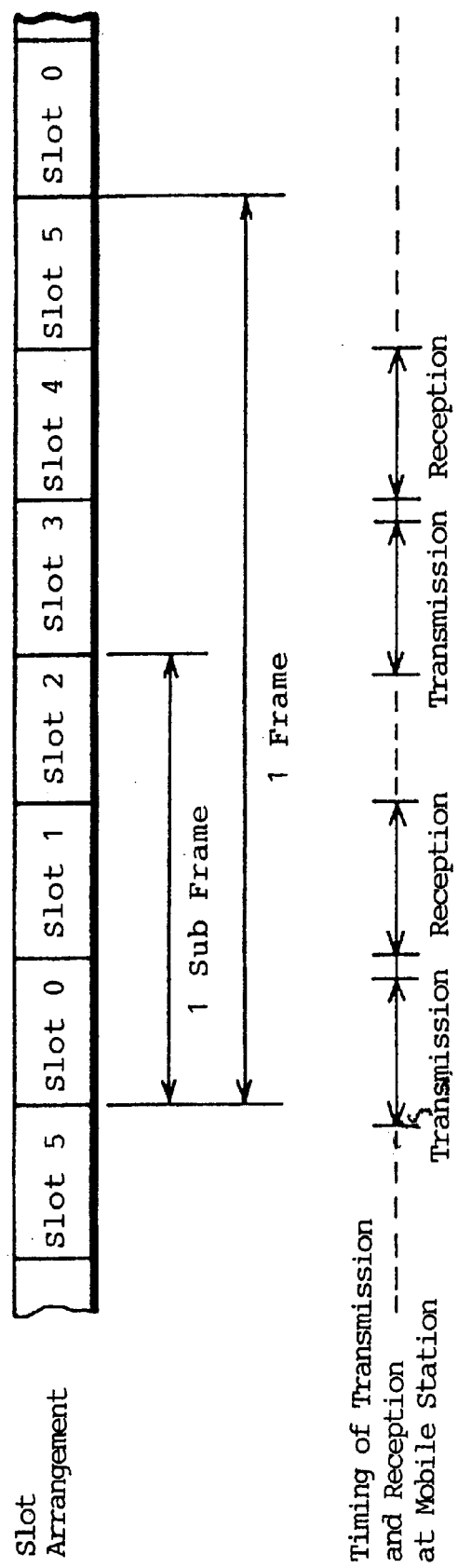
FIG. 1 is an explanatory diagram showing an example of a time-slot arrangement of a radio telephone system.

The above explanation has been made based on calculation in an ideal hexagonal cell. While a satisfactory transmission state is secured with up to 6 use time slots per one frame in this embodiment, it can be considered that 8 time slots or more of 16 time slots prepared in one frame are used practically. If a transmission quality is not sufficient even by using all the 16 time slots prepared in one frame, a satisfactory transmission is achieved by increasing a transmission output from the base station within a range of several dB. Change of the transmission output can be realized by changing an output of the transmission amplifier 22, for example, in the case of the base station having the arrangement shown in FIG. 1.

It is not frequently observed in view of probability that all the time slots are used in one cell and the transmission output must be increased. Since the frequency used for transmission is changed in every time slot in this embodiment, there is little possibility that increase of the transmission output harmfully affects communication in another cell.

Example of Transmission of Scrambled Data

An example of transmission of scrambled data according to another embodiment of the present invention will be described with reference to FIGS. 32 to 35.

Figure 32:
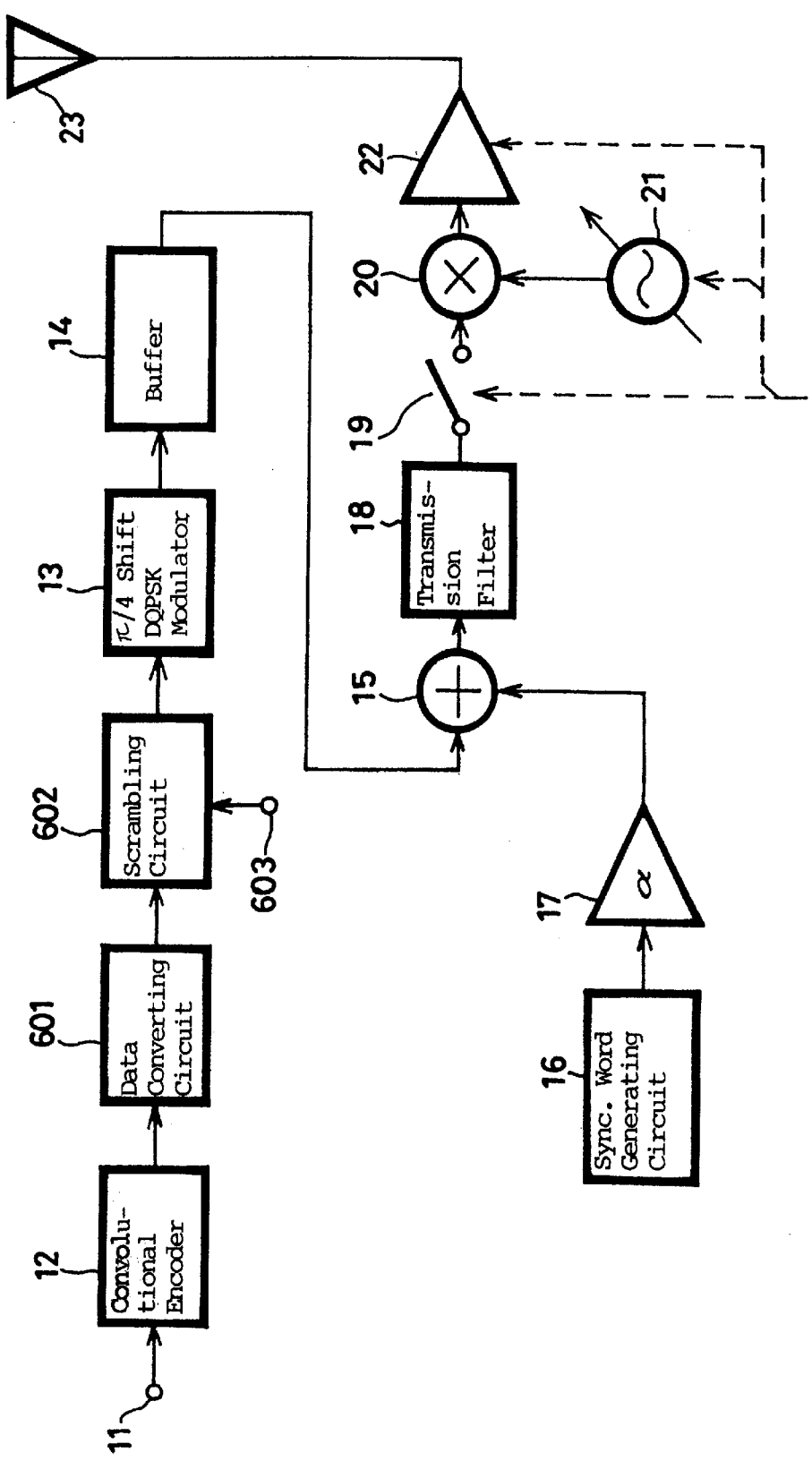
FIG. 32 is a diagram showing an arrangement of a transmission system of a base station according to another embodiment of the present invention.

FIG. 32 is a diagram showing an arrangement of the base station according to this embodiment. In this embodiment, a convolutional-encoded data output from the convolutional encoder 12 is supplied to a data converting circuit 601 for converting a data series. The converted data is supplied to a scrambling circuit 602. The scrambling circuit 602 multiplies the data and a known scrambling pattern obtained at a terminal 603 to obtain a scrambled data. The scrambling circuit supplies the scrambled data to a π/4 shift DQPSK modulator 13 which πn/4 shift DQPSK modulates the scrambled data. Other parts of the arrangement are similar to those of the base station shown in FIG. 2.

An example of a specific processing in the data converting circuit 601 and the scrambling circuit 602 will be described. It is assumed that the transmission system is a system for transmitting data of 400 bits in one frame (20 msec.) and for transmitting data of a time slot of 400 [mu] twice in one frame, where mu represents a modulation unit.

Initially, information bits ($X_0$ to $X_{399}$) are supplied to the convolutional encoder 12 having a coding rate of 4 to obtain the following [400×4 symbols].

$S_{0,0}$ to $S_{0,399}$
$S_{1,0}$ to $S_{1,399}$
$S_{2,0}$ to $S_{2,399}$
$S_{3,0}$ to $S_{3,399}$

The data converting circuit 601 pairs $S_0$ with $S_1$ and $S_2$ with $S_4$ to obtain the following data.

$m_{0,0}$ to $m_{0,399}$
$m_{1,0}$ to $m_{1,399}$

The scrambling circuit 602 multiplies each pair of data and known scrambling patterns $u^0$ to $U_{399}$ to obtain the following data.

$m'_{0,0}$ to $m'_{0,399}$
$m'_{1,0}$ to $m'_{1,399}$

The π/4 shift DQPSK modulator 13 modulates the data to obtain the following data disposed at signal points of a QPSK signal.

$q_{0,0}$ to $q_{0,399}$
$q_{1,0}$ to $q_{1,399}$

The adder 15 adds the synchronizing word series $w_0$ to $w_{399}$ to $q_0, q_1$ to obtain the following transmission slot data.

$t_{0,0}$ to $t_{0,399}$
$t_{1,0}$ to $t_{1,399}$

Since the transmission frequency is changed in every time slot in this embodiment, the two transmission slot data $t_0, t_1$ are modulated with respective different frequencies and then transmitted.

An arrangement of the reception system of the mobile station is basically the same as that of the reception system shown in FIG. 9. In this embodiment, the Viterbi decoder 57 descrambles the data simultaneously with carrying out the Viterbi decoding.

Figure 33:
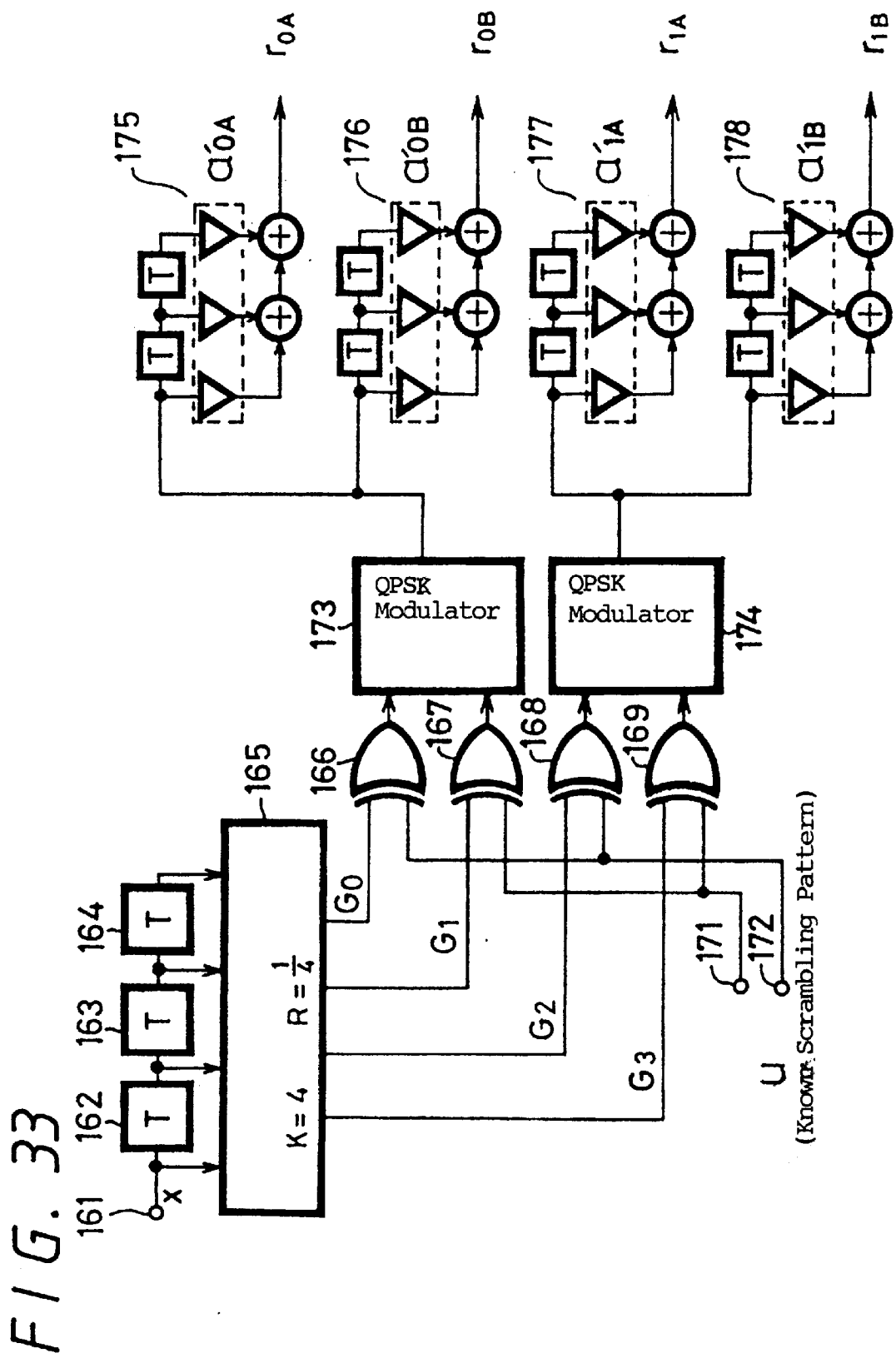
FIG. 33 is a structural diagram showing an example of a model equivalent to a transmission line of the embodiment of shown in FIG. 32.

FIG. 33 shows an equivalent made of the transmission and reception system. A transmission information series X obtained at a terminal 161 is supplied to a convolutional encoder 165 having a coding rate of 4 directly and through delay means 162, 163. Gate circuits 166, 167, 168, 169 superpose known scrambling patterns u obtained at terminals 171, 172 on the transmission information series of respective convolutional encoding characteristics $G_0$, $G_1$, $G_2$, $G_3$. The QPSK modulators 173, 174 phase modulate the scrambled data which thereafter are supplied through transmission-line models each formed of delay means, coefficient multipliers and adders to obtain four kinds of reception data $\Gamma_{0A}, \Gamma_{0B}, \Gamma_{1A}, \Gamma_{1B}$. Of coefficients $a'_{0A}, a'_{0B}, a'_{1A}, a'_{1B}$ respectively set at coefficient multipliers 175, 176, 177, 178 of the transmission-line models, the coefficient $a'_{0A}$ is a transmission-line characteristic estimation value of a reception system of one antenna in the first time slot, the coefficient $a'_{0B}$ is a transmission-line characteristic estimation value of a reception system of another antenna in the first time slot, the coefficient $a'_{1A}$ is a transmission-line characteristic estimation value of a reception system of one antenna in the second time slot, and the coefficient $a'_{1B}$ is a transmission-line characteristic estimation value of a reception system of one antenna in the second time slot. The reception data $\Gamma_{0A}, \Gamma_{0B}, \Gamma_{1A}, \Gamma_{1B}$ are reception data obtained from respective reception systems.

Figure 34:
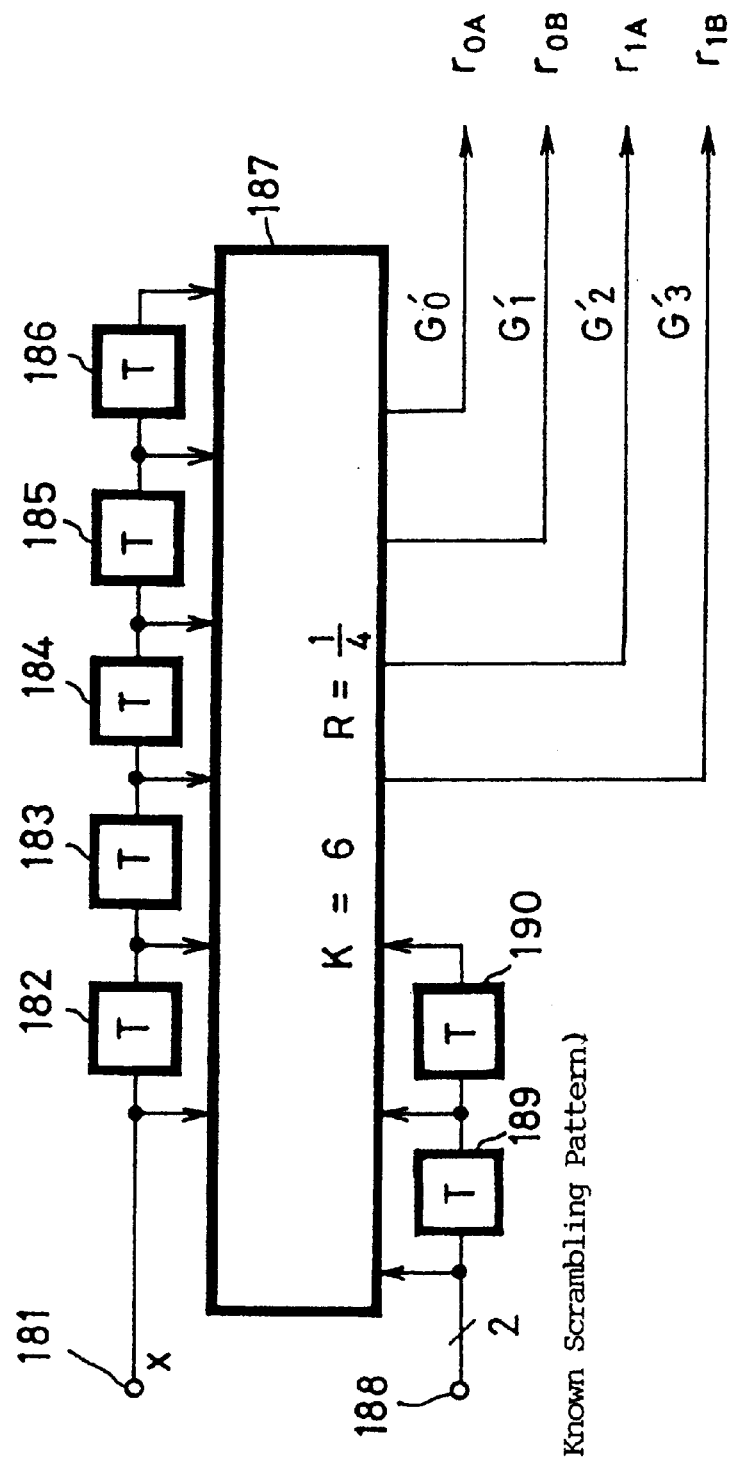
FIG. 34 is a structural diagram showing a simplified model of the equivalent model shown in FIG. 33.

FIG. 34 shows a simplified model of the transmission-line model shown in FIG. 33. A transmission information series X obtained at a terminal 181 is supplied to a convolutional encoder 187 directly and through delay means 182, 183, 184, 185, 186. A known scrambling pattern u is supplied from a terminal 188 to the convolutional encoder 187 directly and through delay means 189, 190. The convolutional encoder 187 carries out convolutional encoding as an encoder having stage number K=6 and a coding rate R=1/4 and carries out Viterbi decoding. Thus, four kinds of reception data $\Gamma_{0A}, \Gamma_{0B}, \Gamma_{1A}, \Gamma_{1B}$ having synthesized characteristics $G'_0, G'_1, G'_2, G'_3$ are obtained.

Figure 35:
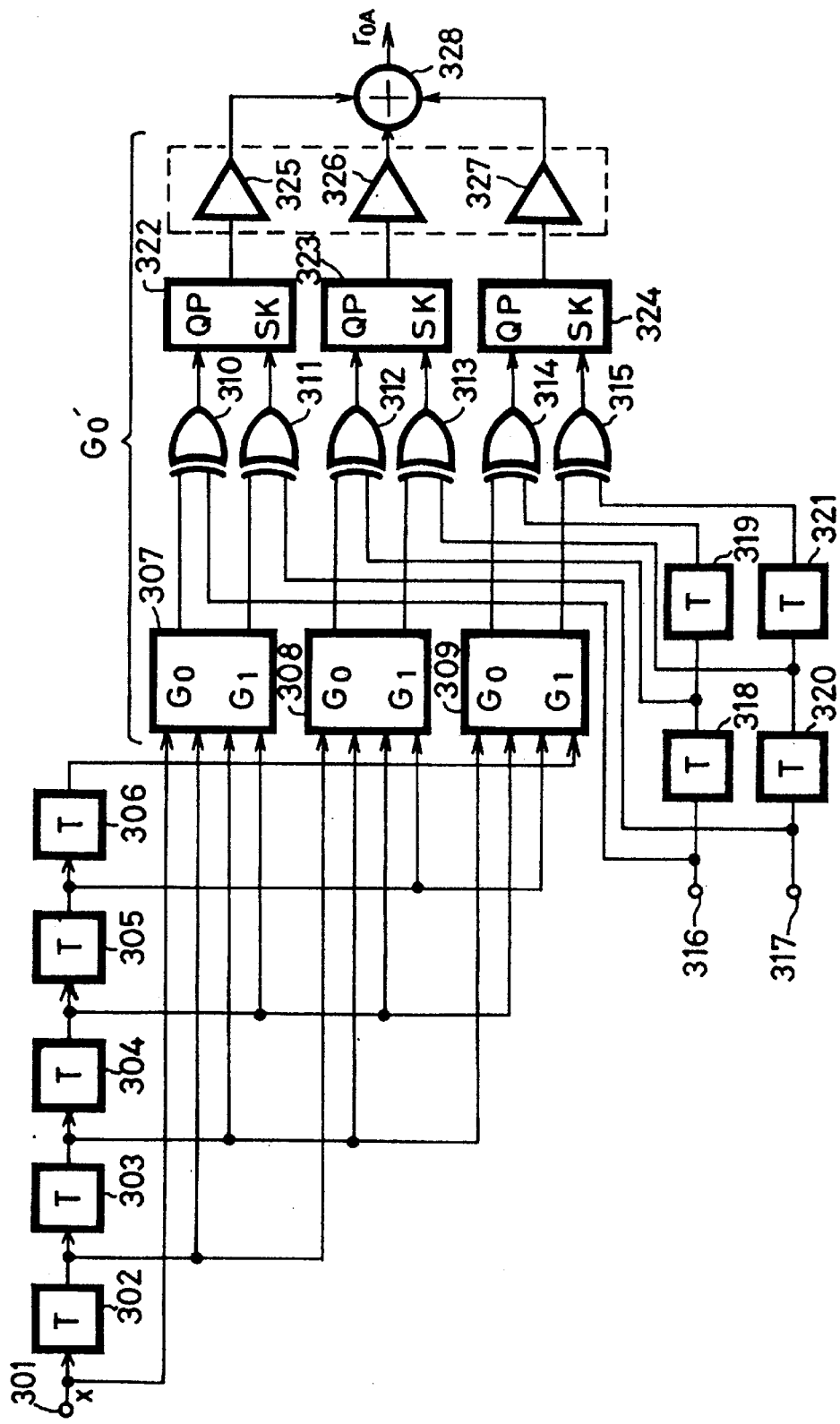
FIG. 35 is a structural diagram showing details of synthesis characteristics according to another embodiment.

FIG. 35 shows details of the synthesized characteristics $G'_0$. A transmission information series X obtained at a terminal 301 is successively supplied to convolutional encoders 307, 308, 309 directly or through delay means 302, 303, 304, 305, 306. Gate circuits 310, 311, 312, 313, 314, 315 carry out processings for superposing scrambling patterns u obtained at terminals 316, 317 on outputs of the convolutional encoders 307, 308, 309 directly and through delay means 318, 319, 320, 321. Outputs from respective gate circuits 310, 311, 312, 313, 314, 315 are supplied to QPSK modulating circuits 322, 323, 324 which convert the outputs into phase-modulated data. Coefficient multipliers 325, 326, 327 for carrying out multiplication with coefficients for transmission-line characteristics multiply the phase-modulated data therewith. An adder 328 adds data of respective systems to obtain reception data $\Gamma_{0A}$. A system from the convolutional encoders 307, 308, 309 to the coefficient multipliers 325, 326, 327 corresponds to the synthesized characteristics $G'_0$.

I claim:

1. A communication system for communication between at least one base station and at least one mobile station, said communication system comprising:

a base station; and a plurality of mobile stations for respectively transmitting and receiving data to and from said base station, wherein any of said base station and a mobile station of said plurality of mobile stations detects a satisfactory or unsatisfactory transmission quality between said base station and said mobile station and changes a multiplexing rate of transmission data based on a detected transmission quality, wherein when said transmission quality is detected to be unsatisfactory said base station communicates with fewer of said plurality of mobile stations in order to lower said multiplexing rate, wherein synchronizing words which differ from one another are respectively set for a plurality of base stations including said base station and each of said plurality of base stations transmits signals in synchronization with one another at a maximum multiplexing rate using slots and slot frequencies equally allocated for each of said plurality of base stations, and said plurality of mobile stations respectively carries out a reception operation with respect to a predetermined slot and slot frequency and calculates a correlation value between a reference synchronizing word and a received signal in order to select a base station corresponding to a received signal with a highest correlation value.

2. A communication system according to claim 1, wherein said base station detects said transmission quality and changes said multiplexing rate of said transmission data based on said detected transmission quality.

3. A communication system according to claim 1, wherein at least one of said base station and said plurality of mobile stations includes detecting means for detecting said transmission quality based on received data.

4. A communication system according to claim 3, wherein said base station changes said multiplexing rate and a coding rate of said transmission data based on said transmission quality detected by said detecting means.

5. A communication system according to claim 3, wherein
said base station mixes said transmission data with a synchronizing word at a constant ratio for transmission, and
said plurality of mobile stations include respective detecting means for detecting a correlation value of a transmitted synchronizing word to detect a transmission state between said base station and said plurality of mobile stations.

6. A communication system according to claim 1, wherein said plurality of mobile stations respectively
detects a correlation value between a signal transmitted from said base station transmitting and receiving data thereto and therefrom and a synchronizing word corresponding to said base station transmitting and receiving data thereto and therefrom,
detects a correlation value between a signal transmitted from another base station adjacent to said base station transmitting and receiving data thereto and therefrom and a synchronizing word corresponding to said adjacent base station, and
carries out a hand-off process to hand off to said adjacent base station when said correlation value between said signal transmitted from said adjacent base station and said synchronizing word corresponding to said adjacent base station is higher than said correlation value between said synchronizing word corresponding to said base station transmitting and receiving data thereto and therefrom and said signal transmitted from said base station transmitting and receiving data thereto and therefrom.

7. A communication system according to claim 1, wherein
said base station includes encoding means for subjecting said transmission data to a scrambling process, and
said plurality of mobile stations respectively includes decoding means for subjecting scrambled data received from said base station to a descrambling process.

8. A base station for transmitting and receiving data to and from a plurality of mobile stations, said base station comprising:
transmission means for multiplexing and transmitting data;
reception means for receiving data transmitted from a mobile station of said plurality of mobile stations; and
control means for changing a multiplexing rate of said transmission means based on a detected satisfactory or unsatisfactory transmission quality output from said mobile station of said plurality of mobile stations such that when said unsatisfactory transmission quality is detected said base station communicates with fewer of said plurality of mobile stations in order to lower said multiplexing rate, wherein
said base station is part of a plurality of base stations, synchronizing words which differ from one another are respectively set for said plurality of base stations including said base station and each of said plurality of base stations transmits signals in synchronization with one another at a maximum multiplexing rate using slots and slot frequencies equally allocated for each of said plurality of base stations, and
said plurality of mobile stations respectively carries out a reception operation with respect to a predetermined slot and slot frequency and calculates a correlation value between a reference synchronizing word and a received signal in order to select a base station corresponding to a received signal with a highest correlation value.

9. A base station according to claim 8, further including detecting means for detecting said satisfactory or unsatisfactory transmission quality between said mobile station and said base station based on data transmitted from said mobile station, wherein said control means changes said multiplexing rate of said transmission means based on said transmission quality detected by said detecting means.

10. A base station according to claim 8, wherein said transmission means includes synchronizing-word generating means for generating a synchronizing word and adding means for adding said synchronizing word from said synchronizing-word generating means to said transmission data at a predetermined ratio.

11. A base station according to claim 8, wherein said transmission means includes synchronizing-word generating means for generating a synchronizing word and adding means for adding at a predetermined ratio said synchronizing word from said synchronizing-word generating means to said transmission data after said synchronizing word has been multiplied with a predetermined coefficient.

12. A mobile station for transmitting and receiving multiplexed data to and from a base station, said mobile station comprising:
demodulating means for receiving and demodulating data transmitted from a base station, wherein said demodulating means includes
reception means,
word generating means for generating a pseudo synchronizing word based on a reference synchronizing word and estimation information about a transmission state between said generating means and said base station, and
extracting means for extracting data from an output of said reception means using said pseudo synchronizing word generated by said generating means;
detecting means for detecting a quality of transmission with respect to said base station;
transmission means for transmitting data to said base station, said data including data concerning said quality of transmission detected by said detecting means; and
signal generating means for generating a signal used by said base station to change a multiplexing rate based on said quality of transmission detected by said detecting means, said signal being used for changing said multiplexing rate use by said transmission means to transmit to said base station,
wherein said signal causes said base station to communicate with fewer mobile stations in order to lower said multiplexing rate when said quality of transmission is unsatisfactory.

13. A mobile station according to claim 12, characterized in that said mobile station generates a signal used for said base station to change a multiplexing rate based on a detected result of said detecting means and the generated signal used for changing the multiplexing rate is transmitted by said transmission means.

14. A mobile station according to claim 12, wherein said detecting means includes:
  first detecting means for detecting a correlation between a synchronizing word transmitted from said base station and a reference synchronizing word, and
  second detecting means for detecting a S/N ratio of an output from said first detecting means.

15. A mobile station according to claim 12, wherein said generating means includes:
  first generating means for generating said reference synchronizing word,
  estimating means for estimating said transmission state between said generating means and said base station based on an output from said reception means, and
  second generating means for generating said pseudo synchronizing word based on said reference synchronizing word generated by said first generating means and said estimation information output from said estimating means.

16. A mobile station according to claim 12, further comprising:
  generating means for respectively generating a plurality of synchronizing words for a plurality of base stations including said base station, and
  synchronizing-word selecting means for detecting respective correlations between a received signal from said demodulating means and each of said plurality of synchronizing words generated by said generating means and for selecting a synchronizing word from said plurality of synchronizing words having a highest correlation value, wherein said demodulating means is controlled based on said synchronizing word output from said synchronizing-word selecting means.

17. A mobile station according to claim 16, wherein said synchronizing-word selecting means includes:
  correlation value detecting means for detecting said correlations between said received signal from said demodulating means and each of said plurality of synchronizing words generated by said generating means, and
  selecting means for selecting said synchronizing word generated by said generating means having said highest correlation value based on an output from said correlation value detecting means.

18. A mobile station according to claim 17, wherein said synchronizing-word selecting means includes position detecting means for detecting a position of said highest correlation value based on an output from said selecting means.

19. A mobile station according to claim 17, wherein said synchronizing-word selecting means includes base-station selecting means for selecting an optimal base station from said plurality of base stations including said base station based on an output from said correlation value detecting means.

20. A radio communication system for use with at least one base station and at least one mobile station, said radio communication system comprising:
  a base station for multiplexing and transmitting data; and
  a plurality of mobile stations for respectively transmitting and receiving data to and from said base station through a radio transmission line, wherein
  one of said base station and a mobile station of said plurality of mobile stations includes detecting means for detecting a satisfactory or unsatisfactory transmission quality of data transmitted through said radio transmission line based on data transmitted through said radio transmission line and changing a multiplexing rate of transmission data based on a detected transmission quality,
  when said transmission quality is detected to be unsatisfactory said base station communicates with fewer of said plurality of mobile stations in order to lower said multiplexing rate, and
  said plurality of mobile stations respectively
    detects a correlation value between a signal transmitted from said base station transmitting and receiving data thereto and therefrom and a synchronizing word corresponding to said based station transmitting and receiving data thereto and therefrom,
    detects a correlation value between a signal transmitted from another base station adjacent to said base station transmitting and receiving data thereto and therefrom and a synchronizing word corresponding to said adjacent base station, and
    carries out a hand-off process to hand off to said adjacent base station when said correlation value between said signal transmitted from said adjacent base station and said synchronizing word corresponding to said adjacent base station is higher than said correlation value between said synchronizing word corresponding to said base station transmitting and receiving data thereto and therefrom and said signal transmitted from said base station transmitting and receiving data thereto and therefrom.

21. A radio communication system according to claim 20, wherein said multiplexing rate is increased by said detecting means when said transmission quality is detected to be satisfactory.

22. A radio communication system according to claim 21, wherein said base station includes detecting means for changing said multiplexing rate of said transmission data based on said detected transmission quality.

23. A radio communication system according to claim 20, wherein said detecting means detects said transmission quality based on received data.

24. A radio communication system according to claim 23, wherein said base station changes said multiplexing rate of said transmission data by changing a coding rate of said transmission data based on said detected transmission quality detected by said detecting means.

25. A radio communication system according to claim 23, wherein
  said base station mixes said transmission data with a synchronizing word at a constant ratio for transmission, and
  said detecting means of said mobile station detects a correlation value of a transmitted synchronizing word to detect a transmission state between said base station and said mobile station.

26. A radio communication system according to claim 20, wherein a plurality of synchronizing words which differ from one another are set for each of a plurality of base stations including said base station and each of said plurality of base stations transmits signals in synchronization with one another at a maximum multiplexing rate using slots and slot frequencies equally allocated for each of said plurality of base stations, and
  said plurality of mobile stations respectively carries out a reception operation with respect to a predetermined slot and slot frequency and calculates a correlation value between a reference synchronizing word and a received signal in order to select a base station from said plurality of base stations corresponding to a received signal with a highest correlation value.

27. A radio communication system according to claim 20, wherein said plurality of mobile stations respectively includes a decoder for demodulating received data using a Viterbi algorithm, said decoder determining that when a number of data 0 stored in path memories of of said decoder is close to a number of states of said decoder, bit data received at that time has satisfactory reliability, and when said number of data 0 is equal to a number of data 1, bit data received at that time has low reliability.

28. A radio communication system according to claim 20, wherein said base station includes encoding means for subjecting said transmission data to a scrambling process, and said plurality of mobile stations includes respective decoding means for subjecting a received signal to a descrambling process.

* * * * *